(12) United States Patent
Iyengar

(10) Patent No.: US 12,319,863 B2
(45) Date of Patent: Jun. 3, 2025

(54) ABRASIVE ARTICLE INCLUDING SHAPED ABRASIVE PARTICLES

(71) Applicants: SAINT-GOBAIN ABRASIVES, INC., Worcester, MA (US); SAINT-GOBAIN ABRASIFS, Conflans-Sainte-Honorine (FR)

(72) Inventor: Sujatha K. Iyengar, Northborough, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 800 days.

(21) Appl. No.: 17/369,356

(22) Filed: Jul. 7, 2021

(65) Prior Publication Data

US 2021/0332278 A1    Oct. 28, 2021

Related U.S. Application Data

(63) Continuation of application No. 15/402,786, filed on Jan. 10, 2017, now Pat. No. 11,091,678, which is a continuation of application No. 14/579,143, filed on Dec. 22, 2014, now Pat. No. 9,566,689.

(60) Provisional application No. 61/922,206, filed on Dec. 31, 2013.

(51) Int. Cl.
*C09K 3/14* (2006.01)
*B24D 11/00* (2006.01)

(52) U.S. Cl.
CPC ............ *C09K 3/1409* (2013.01); *B24D 11/00* (2013.01); *B24D 11/005* (2013.01)

(58) Field of Classification Search
CPC ...... B24D 11/005; B24D 11/00; C09K 3/1409
See application file for complete search history.

(56) References Cited

U.S. PATENT DOCUMENTS

| | | | |
|---|---|---|---|
| 345,604 | A | 7/1886 | Semper |
| 1,910,444 | A | 5/1933 | Nicholson |
| 2,033,991 | A | 3/1936 | Melton et al. |
| 2,036,903 | A | 4/1936 | Webster |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

Torre, "Investigation of Shaped Abrasive Particles vol. 1: Review of U.S. Pat. No. 6,054,093 Apr. 25, 2000" © Apr. 2011.

(Continued)

*Primary Examiner* — Pegah Parvini
(74) *Attorney, Agent, or Firm* — Abel Schillinger, LLP; Arpan Ghosh

(57) ABSTRACT

A fixed abrasive article including a blend of abrasive particles having a first type of shaped abrasive particle comprising a first height (h1), a second type of shaped abrasive particle comprising a second height (h2) less than the first height, where the blend of abrasive particles includes a first content of the first type of shaped abrasive particles and a second content of the second type of shaped abrasive particle, and the first content is different as compared to the second content.

20 Claims, 7 Drawing Sheets

(56) References Cited

U.S. PATENT DOCUMENTS

| | | |
|---|---|---|
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Gluchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe et al. |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |

(56) References Cited

U.S. PATENT DOCUMENTS

| | | |
|---|---|---|
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram et al. |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani et al. |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,406,200 B2 | 6/2002 | Mahoney |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |

(56) References Cited

U.S. PATENT DOCUMENTS

| | | |
|---|---|---|
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl et al. |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |

(56) References Cited

U.S. PATENT DOCUMENTS

| | | |
|---|---|---|
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm et al. |
| 2010/0146867 A1 | 6/2010 | Boden et al. |
| 2010/0151195 A1 | 6/2010 | Culler et al. |
| 2010/0151196 A1* | 6/2010 | Adefris ............... C09K 3/1409 428/142 |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1 | 12/2012 | Gonzales et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0325917 A1 | 11/2014 | Czerepinski et al. |
| 2014/0345204 A1 | 11/2014 | Wang et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0068130 A1 | 3/2015 | Louapre et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0053151 A1 | 2/2016 | Bauer et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |
| 2016/0289520 A1 | 10/2016 | Bujnowski et al. |
| 2016/0289521 A1 | 10/2016 | Colet et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |

(56) References Cited

U.S. PATENT DOCUMENTS

| | | |
|---|---|---|
| 2016/0354898 A1 | 12/2016 | Nienaber et al. |
| 2016/0362589 A1 | 12/2016 | Bauer et al. |
| 2016/0375556 A1 | 12/2016 | Seth et al. |
| 2017/0015886 A1 | 1/2017 | Czerepinski et al. |
| 2017/0028531 A1 | 2/2017 | Gaeta et al. |
| 2017/0050293 A1 | 2/2017 | Gaeta et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0145274 A1 | 5/2017 | Yener et al. |
| 2017/0158930 A1 | 6/2017 | Iyengar |
| 2017/0225299 A1 | 8/2017 | Keipert et al. |
| 2017/0247592 A1 | 8/2017 | Bauer et al. |
| 2017/0335155 A1 | 11/2017 | Czerepinski et al. |
| 2017/0335156 A1 | 11/2017 | Bauer et al. |
| 2017/0342303 A1 | 11/2017 | Stevenson et al. |
| 2017/0349797 A1 | 12/2017 | Yener et al. |
| 2018/0002584 A1 | 1/2018 | Yener et al. |
| 2018/0086957 A1 | 3/2018 | Sahlin et al. |
| 2018/0155592 A1 | 6/2018 | Josseaux et al. |
| 2018/0161960 A1 | 6/2018 | Wilson et al. |
| 2018/0169837 A1 | 6/2018 | Liu |
| 2018/0187057 A1 | 7/2018 | Bujnowski et al. |
| 2018/0215975 A1 | 8/2018 | Marazano et al. |
| 2018/0215976 A1 | 8/2018 | Cotter et al. |
| 2018/0237675 A1 | 8/2018 | Yener et al. |
| 2018/0318983 A1 | 11/2018 | Wilson et al. |
| 2018/0327644 A1 | 11/2018 | Bauer et al. |
| 2018/0370857 A1 | 12/2018 | Marlin et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0119540 A1 | 4/2019 | Colet et al. |
| 2019/0126436 A1 | 5/2019 | Westberg et al. |
| 2019/0160630 A1 | 5/2019 | Jiang et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0284461 A1 | 9/2019 | Josseaux et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0358776 A1 | 11/2019 | Seth et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2020/0308462 A1 | 10/2020 | Bauer et al. |
| 2020/0391354 A1 | 12/2020 | Marazano et al. |
| 2021/0024798 A1 | 1/2021 | Czerepinski et al. |
| 2021/0087444 A1 | 3/2021 | Stevenson et al. |
| 2021/0087445 A1 | 3/2021 | Cotter et al. |
| 2021/0108117 A1 | 4/2021 | Bauer et al. |
| 2021/0108118 A1 | 4/2021 | Yener et al. |
| 2021/0130667 A1 | 5/2021 | Arcona et al. |
| 2021/0197339 A1 | 7/2021 | Marlin et al. |
| 2021/0198544 A1 | 7/2021 | Marlin et al. |
| 2021/0198545 A1 | 7/2021 | Marlin et al. |
| 2021/0332278 A1 | 10/2021 | Iyengar |
| 2021/0395587 A1 | 12/2021 | Yener et al. |
| 2022/0001512 A1 | 1/2022 | Gaeta et al. |
| 2022/0025237 A1 | 1/2022 | Sahlin et al. |
| 2023/0061952 A1 | 3/2023 | Lentz et al. |
| 2023/0065541 A1 | 3/2023 | Colet et al. |
| 2023/0096577 A1 | 3/2023 | Cotter et al. |
| 2023/0135441 A1 | 5/2023 | Seth et al. |
| 2023/0193100 A1 | 6/2023 | Josseaux et al. |
| 2023/0211466 A1 | 7/2023 | Martone et al. |
| 2023/0211467 A1 | 7/2023 | Martone et al. |
| 2023/0211468 A1 | 7/2023 | Martone et al. |
| 2023/0220255 A1 | 7/2023 | Yuyang et al. |
| 2023/0220256 A1 | 7/2023 | Bujnowski et al. |
| 2023/0265326 A1 | 8/2023 | Adefris |
| 2023/0272254 A1 | 8/2023 | Yener et al. |
| 2023/0294247 A1 | 9/2023 | Liu at al. |
| 2023/0332030 A1 | 10/2023 | Bauer et al. |
| 2023/0357617 A9 | 11/2023 | Yener et al. |
| 2024/0116153 A1 | 4/2024 | Martone et al. |
| 2024/0123574 A1 | 4/2024 | Martone et al. |
| 2024/0141219 A1 | 5/2024 | Bauer et al. |
| 2024/0198488 A1 | 6/2024 | Marlin et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A2 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |

(56) References Cited

FOREIGN PATENT DOCUMENTS

| | | |
|---|---|---|
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2006224201 A | 8/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 1995016756 A1 | 6/1995 |
| WO | 1995017287 A1 | 6/1995 |
| WO | 95/18192 A1 | 7/1995 |
| WO | 95/20469 A1 | 8/1995 |
| WO | 1996012776 A1 | 5/1996 |
| WO | 1996014964 A1 | 5/1996 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010118440 A2 | 10/2010 |
| WO | 2010151201 A1 | 12/2010 |
| WO | 2011005425 A2 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A1 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A2 | 3/2013 |
| WO | 2013045251 A1 | 4/2013 |
| WO | 2013049239 A1 | 4/2013 |
| WO | 2013070576 A2 | 5/2013 |
| WO | 2013101575 A1 | 7/2013 |
| WO | 2013102170 A1 | 7/2013 |
| WO | 2013102176 A1 | 7/2013 |
| WO | 2013102177 A1 | 7/2013 |
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | 2014005120 A1 | 1/2014 |
| WO | 2014020068 A1 | 2/2014 |
| WO | 2014020075 A1 | 2/2014 |

(56) References Cited

FOREIGN PATENT DOCUMENTS

| | | |
|---|---|---|
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2017197002 A1 | 11/2017 |
| WO | 2017197006 A1 | 11/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018226912 A1 | 12/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |

(56) References Cited

FOREIGN PATENT DOCUMENTS

| | | |
|---|---|---|
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |
| WO | 2022022905 A1 | 2/2022 |
| WO | 2022022906 A1 | 2/2022 |
| WO | 2022229744 A1 | 11/2022 |
| WO | 2023130051 A1 | 7/2023 |
| WO | 2023130052 A1 | 7/2023 |
| WO | 2023130053 A1 | 7/2023 |
| WO | 2023209518 A1 | 11/2023 |
| WO | 2024127255 A1 | 6/2024 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.
Besse, John R., "Understanding and controlling wheel truing and dressing forces when rotary plunge dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
WINTER Catalogue No. 5, Dressing tools, WINTER diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.
International Search Report and Written Opinion for Application No. PCT/US2020/066817, mailed Apr. 15, 2021, 11 pages.
International Search Report and Written Opinion for Application No. PCT/US2014/058378, mailed Jan. 29, 2015, 18 pages.
International Search Report and Written Opinion for Application No. PCT/US2015/025825) mailed Jul. 16, 2015, 13 pages.
International Search Report and Written Opinion for Application No. PCT/US2014/071870) mailed Apr. 16, 2015, 14 pages.

* cited by examiner

ABRASIVE ARTICLE INCLUDING SHAPED ABRASIVE PARTICLES

CROSS-REFERENCE TO RELATED APPLICATION(S)

This application is a continuation of and claims priority under 35 U.S.C. § 120 to U.S. patent application Ser. No. 15/402,786, entitled "Abrasive Article Including Shaped Abrasive Particles," by Sujatha Iyengar, filed Jan. 10, 2017, which is a continuation of and claims priority under 35 U.S.C. § 120 to U.S. patent application Ser. No. 14/579,143, entitled "Abrasive Article Including Shaped Abrasive Particles," by Sujatha Iyengar, filed Dec. 22, 2014, now U.S. Pat. No. 9,566,689, which claims priority under 35 U.S.C. § 119(e) to U.S. Patent Application No. 61/922,206 entitled "Abrasive Article Including Shaped Abrasive Particles," by Sujatha Iyengar, filed Dec. 31, 2013, all of which are assigned to the current assignee hereof and incorporated herein by reference in their entireties.

BACKGROUND

Field of the Disclosure

The following is directed to abrasive articles, and particularly, abrasive articles including shaped abrasive particles.

Description of the Related Art

Abrasive particles and abrasive articles made from abrasive particles are useful for various material removal operations, including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain-sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

A fixed abrasive article including a blend of abrasive particles having a first type of shaped abrasive particle comprising a first height (h1), a second type of shaped abrasive particle comprising a second height (h2) less than the first height.

A fixed abrasive article comprising a blend of abrasive particles comprising a first type of shaped abrasive particle comprising a first height (h1), a second type of shaped abrasive particle comprising a second height (h2) less than the first height, and wherein the fixed abrasive article comprises a stainless steel lifespan of at least about 11 in$^3$.

A method of removing material from a workpiece using an abrasive article including a blend of abrasive particles comprising a first type of shaped abrasive particle comprising a first height (h1), and a second type of shaped abrasive particle comprising a second height (h2) less than the first height.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive articles including. The methods herein may be utilized in forming shaped abrasive particles and using abrasive articles incorporating shaped abrasive particles. The shaped abrasive particles may be utilized in various applications, including for example coated abrasives, bonded abrasives, free abrasives, and a combination thereof. Various other uses may be derived for the shaped abrasive particles.

Shaped Abrasive Particles

Various methods may be utilized to obtain shaped abrasive particles. The particles may be obtained from a commercial source or fabricated. Some suitable processes used to fabricate the shaped abrasive particles can include, but are not limited to, screen-printing, molding, pressing, casting, sectioning, cutting, dicing, punching, drying, curing, depositing, coating, extruding, rolling, and a combination thereof.

Figure 1A:
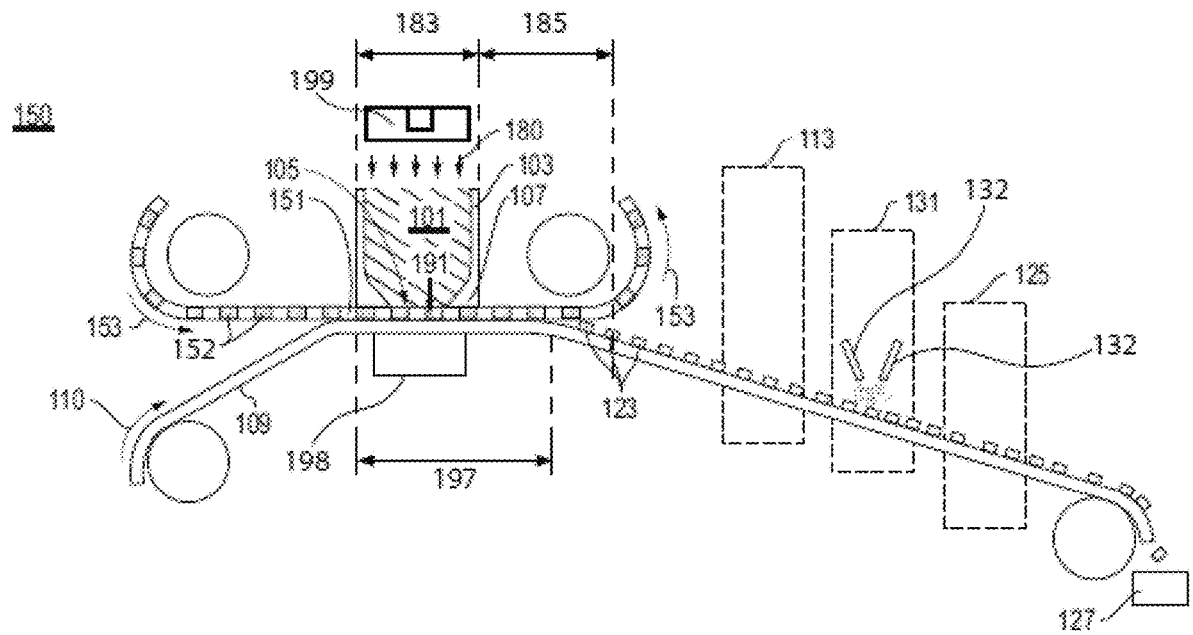
FIG. 1A includes a portion of a system for forming a particulate material in accordance with an embodiment.

FIG. 1A includes an illustration of a system 150 for forming a shaped abrasive particle in accordance with one non-limiting embodiment. The process of forming shaped abrasive particles can be initiated by forming a mixture 101, including a ceramic material and a liquid. In particular, the mixture 101 can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates, including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials, including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1\times10^4$ Pa, such as at least about $4\times10^4$ Pa, or even at least about $5\times10^4$ Pa. However, in at least one non-limiting embodiment, the mixture 101 may have a storage modulus of not greater than about $1\times10^7$ Pa, such as not greater than about $2\times10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm, and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm, and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4\times10^3$ Pa s, at least about $5\times10^3$ Pa s, at least about $6\times10^3$ Pa s, at least about $8\times10^3$ Pa s, at least about $10\times10^3$ Pa s, at least about $20\times10^3$ Pa s, at least about $30\times10^3$ Pa s, at least about $40\times10^3$ Pa s, at least about $50\times10^3$ Pa s, at least about $60\times10^3$ Pa s, or at least about $65\times10^3$ Pa s. In at least one non-limiting embodiment, the mixture 101 may have a viscosity of not greater than about $100\times10^3$ Pa s, such as not greater than about $95\times10^3$ Pa s, not greater than about $90\times10^3$ Pa s, or even not greater than about $85\times10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials, including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate the processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1A, can include a die 103. As illustrated, the mixture 101 can be provided within the interior of the die 103 and configured to be extruded through a die opening 105 positioned at one end of the die 103. As further illustrated, extruding can include applying a force 180 (such as a pressure) on the mixture 101 to facilitate extruding the mixture 101 through the die opening 105. In an embodiment, the system 150 can generally be referred to as a screen printing process. During extrusion within an application zone 183, a screen 151 can be in direct contact with a portion of a belt 109. The screen printing process can include extruding the mixture 101 from the die 103 through the die opening 105 in a direction 191. In particular, the screen printing process may utilize the screen 151 such that, upon extruding the mixture 101 through the die opening 105, the mixture 101 can be forced into an opening 152 in the screen 151.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Figure 1B:
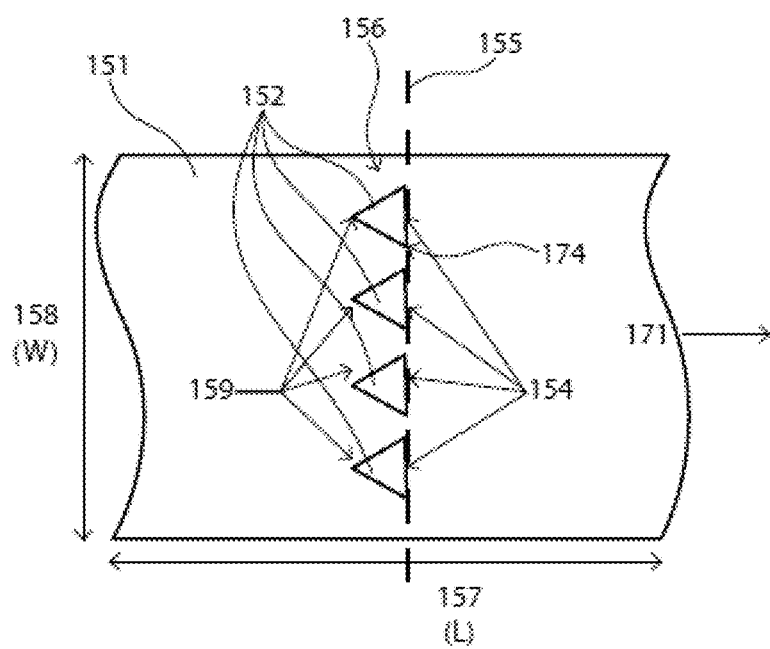
FIG. 1B includes a portion of the system of FIG. 1A for forming a particulate material in accordance with an embodiment.

Referring briefly to FIG. 1B, a portion of the screen 151 is illustrated. As shown, the screen 151 can include the opening 152, and more particularly, a plurality of openings 152 extending through the volume of the screen 151. In accordance with an embodiment, the openings 152 can have a two-dimensional shape as viewed in a plane defined by the length (l) and width (w) of the screen. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as a triangle, a rectangle, a quadrilateral, a pentagon, a hexagon, a heptagon, an octagon, a nonagon, a decagon, and a combination thereof.

As further illustrated, the screen 151 can have openings 152 that are oriented in a particular manner relative to each other. As illustrated and in accordance with one embodiment, each of the openings 152 can have substantially the same orientation relative to each other and substantially the same orientation relative to the surface of the screen. For example, each of the openings 152 can have a first edge 154 defining a first plane 155 for a first row 156 of the openings 152 extending laterally across a lateral axis 158 of the screen 151. The first plane 155 can extend in a direction substantially orthogonal to a longitudinal axis 157 of the screen 151. However, it will be appreciated that in other instances, the openings 152 need not necessarily have the same orientation relative to each other.

Moreover, the first row 156 of openings 152 can be oriented relative to a direction of translation to facilitate particular processing and controlled formation of shaped abrasive particles. For example, the openings 152 can be arranged on the screen 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the openings 152 can be arranged on the screen 151 such that the first plane 155 of the first row 156 defines a different angle with respect to the direction of translation, including, for example, an acute angle or an obtuse angle. Still, it will be appreciated that the openings 152 may not necessarily be arranged in rows. The openings 152 may be arranged in various particular ordered distributions with respect to each other on the screen 151, such as in the form of a two-dimensional pattern. Alternatively, the openings may be disposed in a random manner on the screen 151.

Referring again to FIG. 1A, after forcing the mixture 101 through the die opening 105 and a portion of the mixture 101 through the openings 152 in the screen 151, one or more precursor shaped abrasive particles 123 may be printed on the belt 109 disposed under the screen 151. According to a particular embodiment, the precursor-shaped abrasive particles 123 can have a shape substantially replicating the shape of the openings 152. Notably, the mixture 101 can be forced through the screen in rapid fashion, such that the average residence time of the mixture 101 within the openings 152 can be less than about 2 minutes, less than about 1 minute, less than about 40 seconds, or even less than about 20 seconds. In particular non-limiting embodiments, the mixture 101 may be substantially unaltered during printing as it travels through the screen openings 152, thus experiencing no change in the amount of components from the original mixture, and may experience no appreciable drying in the openings 152 of the screen 151.

Additionally, the system 151 can include a bottom stage 198 within the application zone 183. During the process of forming shaped abrasive particles, the belt 109 can travel over the bottom stage 198, which can offer a suitable substrate for forming. According to one embodiment, the bottom stage 198 can include a particularly rigid construction including, for example, an inorganic material such as a metal or metal alloy having a construction suited to facilitating the formation of shaped abrasive particles according to embodiments herein. Moreover, the bottom stage 198 can have an upper surface that is in direct contact with the belt 109, and that has a particular geometry and/or dimension (e.g., flatness, surface roughness, etc.), which can also facilitate improved control of dimensional characteristics of the shaped abrasive particles.

During operation of the system 150, the screen 151 can be translated in a direction 153 while the belt 109 can be translated in a direction 110 substantially similar to the direction 153, at least within the application zone 183, to facilitate a continuous printing operation. As such, the precursor-shaped abrasive particles 123 may be printed onto the belt 109 and translated along the belt 109 to undergo further processing. It will be appreciated that such further processing can include processes described in the embodiments herein, including for example, shaping, application of other materials (e.g., dopant material), drying, and the like.

In some embodiments, the belt 109 and/or the screen 151 can be translated while extruding the mixture 101 through the die opening 105. As illustrated in the system 100, the mixture 101 may be extruded in a direction 191. The direction of translation 110 of the belt 109 and/or the screen 151 can be angled relative to the direction of extrusion 191 of the mixture 101. While the angle between the direction of translation 110 and the direction of extrusion 191 is illustrated as substantially orthogonal in the system 100, other angles are contemplated, including for example, an acute angle or an obtuse angle.

The belt 109 and/or the screen 151 may be translated at a particular rate to facilitate processing. For example, the belt 109 and/or the screen 151 may be translated at a rate of at least about 3 cm/s. In other embodiments, the rate of translation of the belt 109 and/or the screen 151 may be greater, such as at least about 4 cm/s, at least about 6 cm/s, at least about 8 cm/s, or even at least about 10 cm/s. Still, in at least one non-limiting embodiment, the belt 109 and/or the screen 151 may be translated in a direction 110 at a rate of not greater than about 5 m/s, not greater than about 1 m/s, or even not greater than about 0.5 m/s. It will be appreciated that the belt 109 and/or the screen 151 may be translated at a rate within a range between any of the minimum and maximum values noted above, and moreover, may be translated at substantially the same rate relative to each other. Furthermore, for certain processes according to embodiments herein, the rate of translation of the belt 109 as compared to the rate of extrusion of the mixture 101 in the direction 191 may be controlled to facilitate proper processing.

After the mixture 101 is extruded through the die opening 105, the mixture 101 may be translated along the belt 109 under a knife-edge 107 attached to a surface of the die 103. The knife-edge 107 may define a region at the front of the die 103 that facilitates displacement of the mixture 101 into the openings 152 of the screen 151.

Certain processing parameters may be controlled to facilitate the formation of particular features of the precursor shaped abrasive particles 123 and the finally-formed shaped abrasive particles described herein. Some exemplary process parameters that can be controlled include a release distance 197, a viscosity of the mixture, a storage modulus of the mixture, mechanical properties of the bottom stage, geometric or dimensional characteristics of the bottom stage, thickness of the screen, rigidity of the screen, a solid content of the mixture, a carrier content of the mixture, a release angle, a translation speed, a temperature, a content of release agent, a pressure exerted on the mixture, a speed of the belt, and a combination thereof.

According to one embodiment, one particular process parameter can include controlling the release distance 197 between a filling position and a release position. In particular, the release distance 197 can be a distance measured in a direction 110 of the translation of the belt 109 between the end of the die 103 and the initial point of separation between the screen 151 and the belt 109. According to one embodiment, controlling the release distance 197 can affect at least one dimensional characteristic of the precursor shaped abrasive particles 123 or the finally-formed shaped abrasive particles. Moreover, control of the release distance 197 can affect a combination of dimensional characteristics of the shaped abrasive particles, including but not limited to, length, width, interior height (hi), variation of interior height (Vhi), difference in height, profile ratio, flashing index, dishing index, rake angle, any of the dimensional characteristic variations of the embodiments herein, and a combination thereof.

According to one embodiment, the release distance 197 can be not greater than a length of the screen 151. In other instances, the release distance 197 can be not greater than a width of the screen 151. Still, in one particular embodiment, the release distance 197 can be not greater than 10 times a largest dimension of the opening 152 in the screen 151. For example, the openings 152 can have a triangular shape, such as illustrated in FIG. 1B, and the release distance 197 can be not greater than 10 times the length of one side of the opening 152 defining the triangular shape. In other instances, the release distance 197 can be less, such as not greater than about 8 times the largest dimension of the opening 152 in the screen 151, such as not greater than about 5 times, not greater than about 3 times, not greater than about 2 times, or even not greater than the largest dimension of the opening 152 in the screen 151.

In more particular instances, the release distance 197 can be not greater than about 30 mm, such as not greater than about 20 mm, or even not greater than about 10 mm. For at least one embodiment, the release distance can be substantially zero, and more particularly, can be essentially zero. Accordingly, the mixture 101 can be disposed into the openings 152 within the application zone 183 and the screen 151 and the belt 109 may be separating from each other at the end of the die 103 or even before the end of the die 103.

According to one particular method of forming, the release distance 197 can be essentially zero, which may facilitate substantially simultaneous filling of the openings 152 with the mixture 101 and separation between the belt 109 and the screen 151. For example, before the screen 151 and the belt 109 pass the end of the die 103 and exit the application zone 183, separation of the screen 151 and the belt 109 may be initiated. In more particular embodiments, separation between the screen 151 and the belt 109 may be initiated immediately after the openings 152 are filled with the mixture 101, prior to leaving the application zone 183 and while the screen 151 is located under the die 103. In still another embodiment, separation between the screen 151 and the belt 109 may be initiated while the mixture 101 is being placed within the opening 152 of the screen 151. In an alternative embodiment, separation between the screen 151 and the belt 109 can be initiated before the mixture 101 is placed in the openings 152 of the screen 151. For example, before the openings 152 pass under the die opening 105, the belt 109 and screen 151 are being separated, such that a gap exists between belt 109 and the screen 151 while the mixture 101 is being forced into the openings 152.

Figure 2:
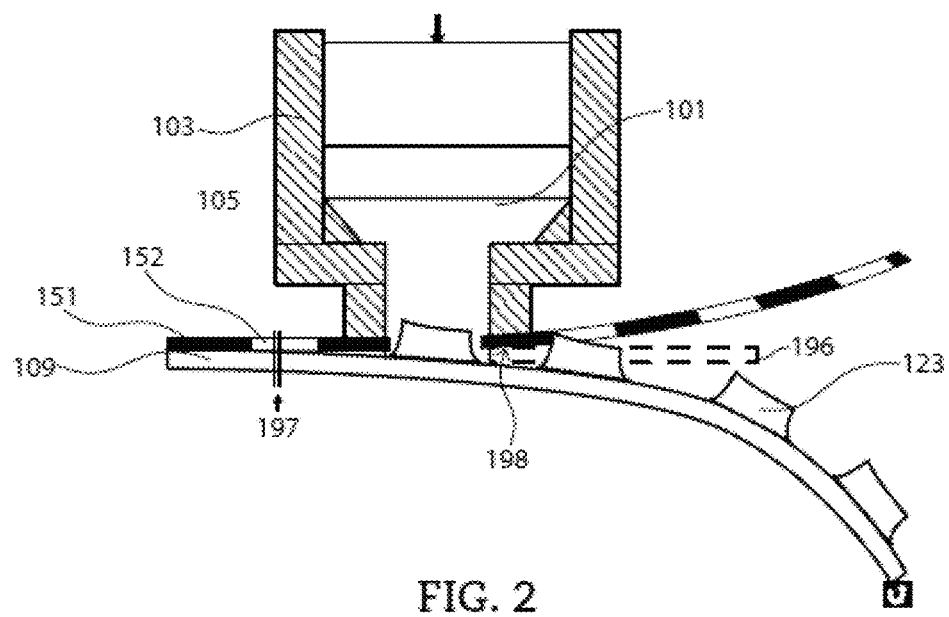
FIG. 2 includes a portion of a system for forming a particulate material in accordance with an embodiment.

For example, FIG. 2 illustrates a printing operation where the release distance 197 is substantially zero, and separation between the belt 109 and the screen 151 is initiated before the belt 109 and screen 151 pass under the die opening 105. More particularly, the release between the belt 109 and the screen 151 is initiated as the belt 109 and screen 151 enter the application zone 183 and pass under the front of the die 103. Still, it will be appreciated that in some embodiments, separation of the belt 109 and screen 151 can occur before the belt 109 and screen 151 enter the application zone 183 (defined by the front of the die 103), such that the release distance 197 may be a negative value.

Control of the release distance 197 can facilitate controlled formation of shaped abrasive particles having improved dimensional characteristics and improved dimensional tolerances (e.g., low dimensional characteristic variability). For example, decreasing the release distance 197 in combination with controlling other processing parameters can facilitate improved formation of shaped abrasive particles having greater interior height (hi) values.

Additionally, as illustrated in FIG. 2, control of the separation height 196 between a surface of the belt 109 and a lower surface 198 of the screen 151 may facilitate controlled formation of shaped abrasive particles having improved dimensional characteristics and improved dimensional tolerances (e.g., low dimensional characteristic variability). The separation height 196 may be related to the thickness of the screen 151, the distance between the belt 109 and the die 103, and a combination thereof. Moreover, one or more dimensional characteristics (e.g., interior height) of the precursor-shaped abrasive particles 123 may be controlled by controlling the separation height 196 and the thickness of the screen 151. In particular instances, the screen 151 can have an average thickness of not greater than about 700 microns, such as not greater than about 690 microns, not greater than about 680 microns, not greater than about 670 microns, not greater than about 650 microns, or not greater than about 640 microns. Still, the average thickness of the screen can be at least about 100 microns, such as at least about 300 microns, or even at least about 400 microns.

In one embodiment, the process of controlling can include a multi-step process that can include measuring, calculating, adjusting, and a combination thereof. Such processes can be applied to the process parameter, a dimensional characteristic, a combination of dimensional characteristics, and a combination thereof. For example, in one embodiment, controlling can include measuring one or more dimensional characteristics, calculating one or more values based on the process of measuring the one or more dimensional characteristics, and adjusting one or more process parameters (e.g., the release distance 197) based on the one or more calculated values. The process of controlling, and particularly any of the processes of measuring, calculating, and adjusting, may be completed before, after, or during the formation of the shaped abrasive particles. In one particular embodiment, the controlling process can be a continuous process, wherein one or more dimensional characteristics are measured, and one or more process parameters are changed (i.e., adjusted) in response to the measured dimensional characteristics. For example, the process of controlling can include measuring a dimensional characteristic such as a difference in the height of the precursor shaped abrasive particles 123, calculating a difference in height value of the precursor shaped abrasive particles 123, and changing the release distance 197 to change the difference in height value of the precursor shaped abrasive particles 123.

Referring again to FIG. 1, after extruding the mixture 101 into the openings 152 of the screen 151, the belt 109 and the screen 151 may be translated to a release zone 185 where the belt 109 and the screen 151 can be separated to facilitate the formation of the precursor shaped abrasive particles 123. In accordance with an embodiment, the screen 151 and the belt 109 may be separated from each other within the release zone 185 at a particular release angle.

In fact, as illustrated, the precursor-shaped abrasive particles 123 may be translated through a series of zones wherein various treating processes may be conducted. Some suitable exemplary treating processes can include drying, heating, curing, reacting, radiating, mixing, stirring, agitating, planarizing, calcining, sintering, comminuting, sieving, doping, and a combination thereof. According to one embodiment, the precursor-shaped abrasive particles 123 may be translated through an optional shaping zone 113, wherein at least one exterior surface of the particles may be shaped as described in embodiments herein. Furthermore, the precursor-shaped abrasive particles 123 may be translated through an optional application zone 131, wherein a dopant material can be applied to at least one exterior surface of the particles as described in embodiments herein. And further, the precursor-shaped abrasive particles 123 may be translated on the belt 109 through an optional post-forming zone 125, wherein a variety of processes, including, for example, drying, may be conducted on the precursor-shaped abrasive particles 123 as described in embodiments herein.

The application zone 131 may be used for applying a material to at least one exterior surface of one or more precursor-shaped abrasive particles 123. In accordance with an embodiment, a dopant material may be applied to the precursor-shaped abrasive particles 123. More particularly, as illustrated in FIG. 1, the application zone 131 can be positioned before the post-forming zone 125. As such, the process of applying a dopant material may be completed on the precursor-shaped abrasive particles 123. However, it will be appreciated that the application zone 131 may be positioned in other places within the system 100. For example, the process of applying a dopant material can be completed after forming the precursor-shaped abrasive particles 123, and more particularly, after the post-forming zone 125. In yet other instances, which will be described in more detail herein, the process of applying a dopant material may be conducted simultaneously with a process of forming the precursor-shaped abrasive particles 123.

Within the application zone 131, a dopant material may be applied utilizing various methods, including for example, spraying, dipping, depositing, impregnating, transferring, punching, cutting, pressing, crushing, and any combination thereof. In particular instances, the application zone 131 may utilize a spray nozzle, or a combination of spray nozzles 132 and 133 to spray dopant material onto the precursor shaped abrasive particles 123.

In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In particular instances, the process of applying a dopant material can include selective placement of the dopant material on at least one exterior surface of a precursor-shaped abrasive particle 123. For example, the process of applying a dopant material can include the application of a dopant material to an upper surface or a bottom surface of the precursor-shaped abrasive particles 123. In still another embodiment, one or more side surfaces of the precursor-shaped abrasive particles 123 can be treated such that a dopant material is applied thereto. It will be appreciated that various methods may be used to apply the dopant material to various exterior surfaces of the precursor-shaped abrasive particles 123. For example, a spraying process may be used to apply a dopant material to an upper surface or side surface of the precursor-shaped abrasive particles 123. Still, in an alternative embodiment, a dopant material may be applied to the bottom surface of the precursor-shaped abrasive particles 123 through a process such as dipping, depositing, impregnating, or a combination thereof. It will be appreciated that a surface of the belt 109 may be treated with dopant material to facilitate a transfer of the dopant material to a bottom surface of precursor-shaped abrasive particles 123.

After forming precursor-shaped abrasive particles 123, the particles may be translated through a post-forming zone 125. Various processes may be conducted in the post-forming zone 125, including treatment of the precursor-shaped abrasive particles 123. In one embodiment, the post-forming zone 125 can include a heating process where the precursor-shaped abrasive particles 123 may be dried. Drying may include the removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the precursor-shaped abrasive particles 123 may be translated through the post-forming zone 125 at a particular rate, such as at least about 0.2 feet/min and not greater than about 8 feet/min.

Furthermore, the drying process may be conducted for a particular duration. For example, the drying process may be not greater than about six hours.

After the precursor-shaped abrasive particles 123 are translated through the post-forming zone 125, the precursor-shaped abrasive particles 123 may be removed from the belt 109. The precursor-shaped abrasive particles 123 may be collected in a bin 127 for further processing.

In accordance with an embodiment, the process of forming shaped abrasive particles may further comprise a sintering process. For certain processes of embodiments herein, sintering can be conducted after collecting the precursor-shaped abrasive particles 123 from the belt 109. Alternatively, the sintering may be a process that is conducted while the precursor-shaped abrasive particles 123 are on the belt 109. Sintering of the precursor-shaped abrasive particles 123 may be utilized to densify the particles, which are generally in a green state. In a particular instance, the sintering process can facilitate the formation of a high-temperature phase of the ceramic material. For example, in one embodiment, the precursor-shaped abrasive particles 123 may be sintered such that a high-temperature phase of alumina, such as alpha-alumina, is formed. In one instance, a shaped abrasive particle can comprise at least about 90 wt % alpha-alumina for the total weight of the particle. In other instances, the content of alpha alumina may be greater such that the shaped abrasive particle may consist essentially of alpha alumina.

Additionally, the body of the finally-formed shaped abrasive particles can have particular two-dimensional shapes. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include triangular, rectangular, trapezoidal, pentagonal, hexagonal, heptagonal, octagonal, nonagonal, decagonal, and any combination thereof. In another embodiment, the body can include a two-dimensional shape, as viewed in a plane defined by a length and a width of the body, including shapes selected from the group consisting of ellipsoids, Greek alphabet characters, Latin alphabet characters, Russian alphabet characters, and a combination thereof.

Figure 3A:
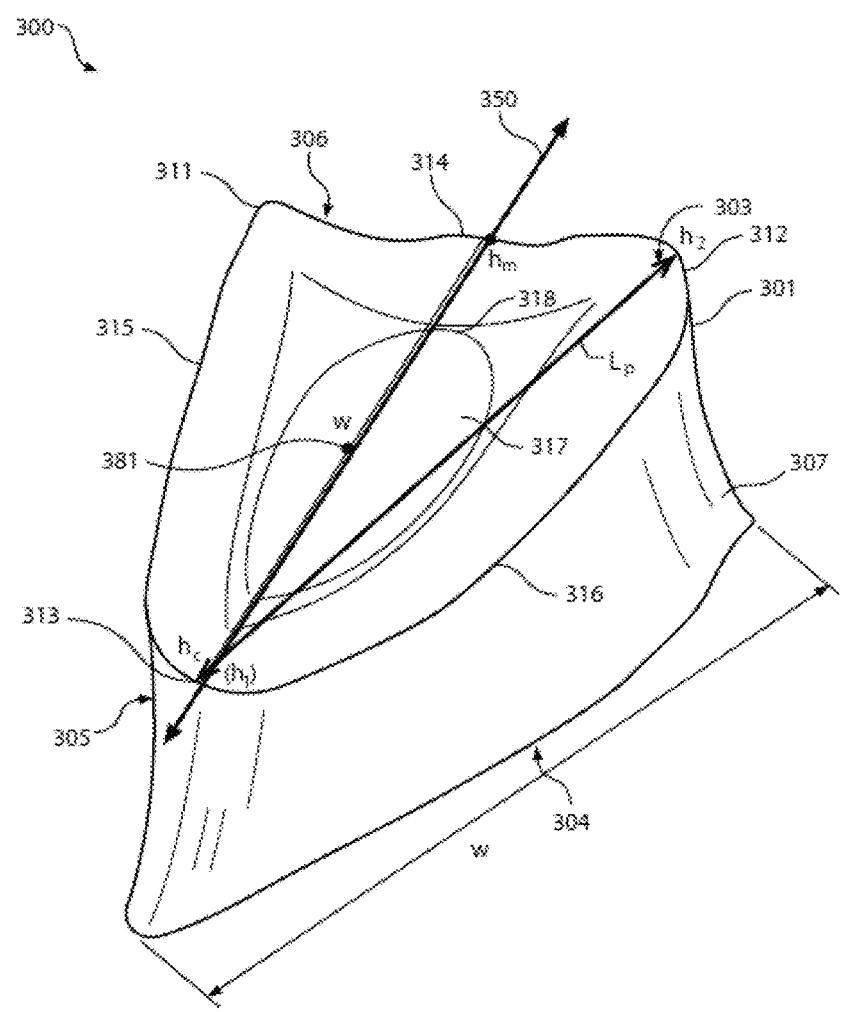
FIG. 3A includes a perspective view illustration of a shaped abrasive particle according to an embodiment.
Figure 3B:
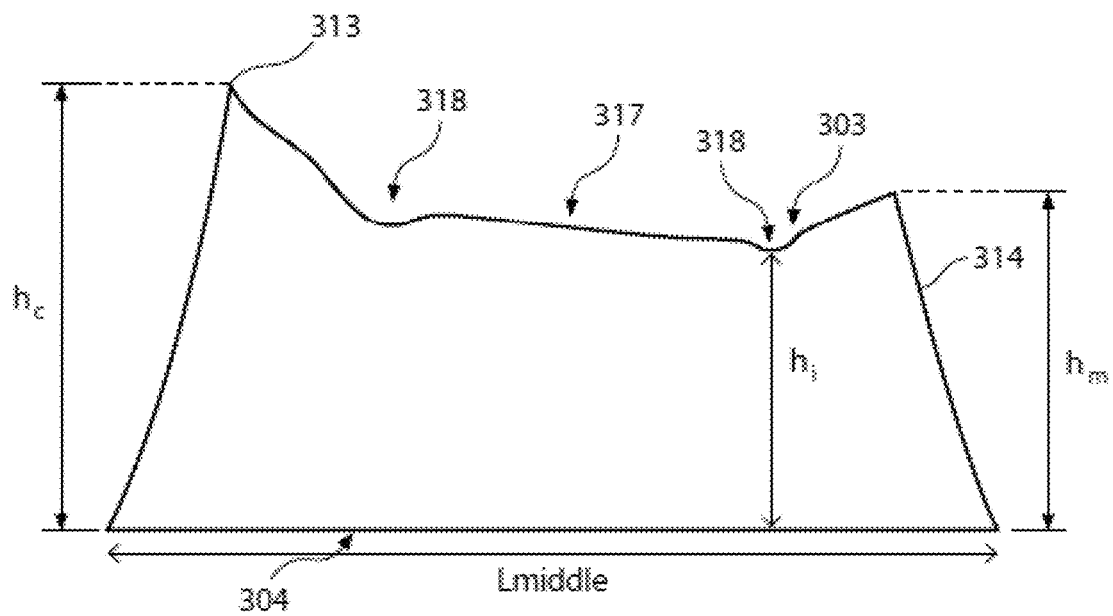
FIG. 3B includes a cross-sectional illustration of the shaped abrasive particle of FIG. 3A.

FIG. 3A includes a perspective view illustration of a shaped abrasive particle 300 in accordance with an embodiment. Additionally, FIG. 3B includes a cross-sectional illustration of the abrasive particle of FIG. 3A. A body 301 of the shaped abrasive particle 300 includes an upper major surface 303 (i.e., a first major surface) and a bottom major surface 304 (i.e., a second major surface) opposite the upper major surface 303. The upper surface 303 and the bottom surface 304 can be separated from each other by side surfaces 305, 306, and 307. As illustrated, the body 301 of the shaped abrasive particle 300 can have a generally triangular shape as viewed in a plane of the upper surface 303. In particular, the body 301 can have a length (Lmiddle) as shown in FIG. 3B, which may be measured at the bottom surface 304 of the body 301 as extending from a corner 313 through a midpoint 381 of the body 301 to a midpoint at the opposite edge 314 of the body. Alternatively, the body 301 can be defined by a second length or profile length (Lp), which is the measure of the dimension of the body 301 from a side view at the upper surface 303 from a first corner 313 to an adjacent corner 312. Notably, the dimension of Lmiddle can be a length defining a distance between a height at a corner (hc) and a height at a midpoint edge (hm) opposite the corner. The dimension Lp can be a profile length along a side of the particle 300 (as seen from a side view such as shown in FIGS. 2A and 2B) defining the distance between h1 and h2. Reference herein to the length can refer to either Lmiddle or Lp.

The body 301 can further include a width (w) that is the longest dimension of the body 301 and extending along a side. The body 301 can further include a height (h), which may be a dimension of the body 301 extending in a direction perpendicular to the length and width in a direction defined by a side surface of the body 301. Notably, as will be described in more detail herein, the body 301 can be defined by various heights depending upon the location on the body 301. In specific instances, the width can be greater than or equal to the length, the length can be greater than or equal to the height, and the width can be greater than or equal to the height.

Moreover, reference herein to any of the features of the embodiments herein, including dimensional characteristic (e.g., h1, h2, hi, w, Lmiddle, Lp, and the like), can be reference to a dimension of a single shaped abrasive particle of a batch, a median value, or an average value derived from analysis of a suitable sampling of shaped abrasive particles from a batch. Unless stated explicitly, reference herein to a dimensional characteristic can be considered a reference to a median value that is based on a statistically significant value derived from a sample size of a suitable number of particles from a batch of particles. Notably, for certain embodiments herein, the sample size can include at least 10 randomly selected particles from a batch of particles. A batch of particles may include an amount of shaped abrasive particles suitable for forming a commercial-grade abrasive product, such as at least about 20 lbs. The batch of particles may be, but need not necessarily be, a group of particles that are collected from a single process run.

In accordance with an embodiment, the body 301 of the shaped abrasive particle can have a first corner height (hc) at a first region of the body defined by a corner 313. Notably, the corner 313 may represent the point of greatest height on the body 301; however, the height at the corner 313 does not necessarily represent the point of greatest height on the body 301. The corner 313 can be defined as a point or region on the body 301 defined by the joining of the upper surface 303, and two side surfaces 305 and 307. The body 301 may further include other corners, spaced apart from each other, including for example, corner 311 and corner 312. As further illustrated, the body 301 can include edges 314, 315, and 316 that can be separated from each other by the corners 311, 312, and 313. The edge 314 can be defined by an intersection of the upper surface 303 with the side surface 306. The edge 315 can be defined by an intersection of the upper surface 303 and side surface 305 between corners 311 and 313. The edge 316 can be defined by an intersection of the upper surface 303 and side surface 307 between corners 312 and 313.

As further illustrated, the body 301 can include a second midpoint height (hm) at a second end of the body 301, which can be defined by a region at the midpoint of the edge 314, which can be opposite the first end defined by the corner 313. The axis 350 can extend between the two ends of the body 301. FIG. 3B is a cross-sectional illustration of the body 301 along the axis 350, which can extend through a midpoint 381 of the body 301 along the dimension of length (Lmiddle) between the corner 313 and the midpoint of the edge 314.

In accordance with an embodiment, the shaped abrasive particles of the embodiments herein, including for example, the particle of FIGS. 3A and 3B can have an average difference in height, which is a measure of the difference between hc and hm. For convention herein, average difference in height will be generally identified as hc−hm, however it is defined as an absolute value of the difference. Therefore, it will be appreciated that average difference in height may be calculated as hm−hc when the height of the body 301 at the midpoint of the edge 314 is greater than the height at the corner 313. More particularly, the average difference in height can be calculated based upon a plurality of shaped abrasive particles from a suitable sample size. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

As illustrated in FIG. 3B, in one particular embodiment, the body 301 of the shaped abrasive particle 300 may have an average difference in height at different locations at the body 301. The body 301 can have an average difference in height, which can be the absolute value of [hc−hm] between the first corner height (hc) and the second midpoint height (hm) that is at least about 20 microns. It will be appreciated that average difference in height may be calculated as hm−hc when the height of the body 301 at a midpoint of the edge is greater than the height at an opposite corner. In other instances, the average difference in height [hc−hm] can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above. Moreover, it will be appreciated that the average difference in height can be based upon an average value of hc. For example, the average height of the body 301 at the corners (Ahc) can be calculated by measuring the height of the body 301 at all corners and averaging the values, and may be distinct from a single value of height at one corner (hc). Accordingly, the average difference in height may be given by the absolute value of the equation [Ahc−hi]. Furthermore, it will be appreciated that the average difference in height can be calculated using a median interior height (Mhi) calculated from a suitable sample size from a batch of shaped abrasive particles and an average height at the corners for all particles in the sample size. Accordingly, the average difference in height may be given by the absolute value of the equation [Ahc−Mhi].

In particular instances, the body 301 can be formed to have a primary aspect ratio, which is a ratio expressed as width:length, having a value of at least 1:1. In other instances, the body 301 can be formed such that the primary aspect ratio (w:1) is at least about 1.5:1, such as at least about 2:1, at least about 4:1, or even at least about 5:1. Still, in other instances, the abrasive particle 300 can be formed such that the body 301 has a primary aspect ratio that is not greater than about 10:1, such as not greater than 9:1, not greater than about 8:1, or even not greater than about 5:1. It will be appreciated that the body 301 can have a primary aspect ratio within a range between any of the ratios noted above. Furthermore, it will be appreciated that reference herein to a height can be a reference to the maximum height measurable of the abrasive particle 300. It will be described later that the abrasive particle 300 may have different heights at different positions within the body 301 of the abrasive particle 300.

In addition to the primary aspect ratio, the abrasive particle 300 can be formed such that the body 301 comprises a secondary aspect ratio, which can be defined as a ratio of length:height, wherein the height is an interior median height (Mhi). In certain instances, the secondary aspect ratio can be at least about 1:1, such as at least about 2:1, at least about 4:1, or even at least about 5:1. Still, in other instances, the abrasive particle 300 can be formed such that the body 301 has a secondary aspect ratio that is not greater than about 1:3, such as not greater than 1:2, or even not greater than about 1:1. It will be appreciated that the body 301 can have a secondary aspect ratio within a range between any of the ratios noted above, such as within a range between about 5:1 and about 1:1.

In accordance with another embodiment, the abrasive particle 300 can be formed such that the body 301 comprises a tertiary aspect ratio, defined by the ratio width:height, wherein the height is an interior median height (Mhi). The tertiary aspect ratio of the body 301 can be can be at least about 1:1, such as at least about 2:1, at least about 4:1, at least about 5:1, or even at least about 6:1. Still, in other instances, the abrasive particle 300 can be formed such that the body 301 has a tertiary aspect ratio that is not greater than about 3:1, such as not greater than 2:1, or even not greater than about 1:1. It will be appreciated that the body 301 can have a tertiary aspect ratio within a range between any of the ratios noted above, such as within a range between about 6:1 and about 1:1.

According to one embodiment, the body 301 of the shaped abrasive particle 300 can have particular dimensions, which may facilitate improved performance. For example, in one instance, the body 301 can have an interior height (hi), which can be the smallest dimension of height of the body 301 as measured along a dimension between any corner and opposite midpoint edge on the body 301. In particular instances, wherein the body 301 is a generally triangular two-dimensional shape, the interior height (hi) may be the smallest dimension of height (i.e., measure between the bottom surface 304 and the upper surface 305) of the body 301 for three measurements taken between each of the three corners and the opposite midpoint edges. The interior height (hi) of the body 301 of a shaped abrasive particle 300 is illustrated in FIG. 3B. According to one embodiment, the interior height (hi) can be at least about 20% the width (w). The height (hi) may be measured by sectioning or mounting and grinding the shaped abrasive particle 300 and viewing in a manner sufficient (e.g., light microscope or SEM) to determine the smallest height (hi) within the interior of the body 301. In one particular embodiment, the height (hi) can be at least about 22% of the width, such as at least about 25%, at least about 30%, or even at least about 33%, of the width of the body 301. For one non-limiting embodiment, the height (hi) of the body 301 can be not greater than about 80% of the width of the body 301, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body 301 can be within a range between any of the above-noted minimum and maximum percentages.

A batch of shaped abrasive particles can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 20% of the width, such as at least about 22%, at least about 25%, at least about 30%, or even at least about 33% of the median width of the shaped abrasive particles of the batch. For one non-limiting embodiment, the median interior height (Mhi) of the body 301 can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width of the body 301. It will be appreciated that the median interior height (Mhi) of the body 301 can be within a range between any of the above-noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above-noted minimum and maximum values.

For another embodiment, the body 301 of the shaped abrasive particle 300 can have an interior height (hi) of at least about 400 microns. More particularly, the height may be at least about 450 microns, such as at least about 475 microns, or even at least about 500 microns. In still one non-limiting embodiment, the height of the body 301 can be not greater than about 3 mm, such as not greater than about 2 mm, not greater than about 1.5 mm, not greater than about 1 mm, or even not greater than about 800 microns. It will be appreciated that the height of the body 301 can be within a range between any of the above-noted minimum and maximum values. Moreover, it will be appreciated that the above range of values can be representative of a median interior height (Mhi) value for a batch of shaped abrasive particles.

For certain embodiments herein, the body 301 of the shaped abrasive particle 300 can have particular dimensions, including, for example, a width≥length, a length≥height, and a width≥height. More particularly, the body 301 of the shaped abrasive particle 300 can have a width (w) of at least about 600 microns, such as at least about 700 microns, at least about 800 microns, or even at least about 900 microns. In one non-limiting instance, the body 301 can have a width of not greater than about 4 mm, such as not greater than about 3 mm, not greater than about 2.5 mm, or even not greater than about 2 mm. It will be appreciated that the width of the body 301 can be within a range between any of the above-noted minimum and maximum values. Moreover, it will be appreciated that the above range of values can be representative of a median width (Mw) for a batch of shaped abrasive particles.

The body 301 of the shaped abrasive particle 300 can have particular dimensions, including, for example, a length (L middle or Lp) of at least about 0.4 mm, such as at least about 0.6 mm, at least about 0.8 mm, or even at least about 0.9 mm. Still, for at least one non-limiting embodiment, the body 301 can have a length of not greater than about 4 mm, such as not greater than about 3 mm, not greater than about 2.5 mm, or even not greater than about 2 mm. It will be appreciated that the length of the body 301 can be within a range between any of the above-noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle 300 can have a body 301 having a particular amount of dishing, wherein the dishing value (d) can be defined as a ratio between an average height of the body 301 at the corners (Ahc) as compared to the smallest dimension of height of the body 301 at the interior (hi). The average height of the body 301 at the corners (Ahc) can be calculated by measuring the height of the body 301 at all corners and averaging the values, and may be distinct from a single value of height at one corner (hc). The average height of the body 301 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, not greater than about 1.5, or even not greater than about 1.2. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 301 of the particle of FIG. 3A can have a bottom surface 304 defining a bottom area ($A_b$). In particular instances, the bottom surface 304 can be the largest surface of the body 301. The bottom major surface 304 can have a surface area defined as the bottom area ($A_b$) that is different than the surface area of the upper major surface 303. In one particular embodiment, the bottom major surface 304 can have a surface area defined as the bottom area ($A_b$) that is different than the surface area of the upper major surface 303. In another embodiment, the bottom major surface 304 can have a surface area defined as the bottom area ($A_b$) that is less than the surface area of the upper major surface 303.

Additionally, the body 301 can have a cross-sectional midpoint area ($A_m$) defining an area of a plane perpendicular to the bottom area ($A_b$) and extending through a midpoint 381 of the particle 300. In certain instances, the body 301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein including, for example, the particle of FIG. 3B, can have a normalized height difference of not greater than about 0.3. The normalized height difference can be defined by the absolute value of the equation [(hc−hm)/(hi)]. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, or even at least about 0.06. It will be appreciated that the normalized height difference can be within a range between any of the minimum and maximum values noted above. Moreover, it will be appreciated that the above-normalized height values can be representative of a median normalized height value for a batch of shaped abrasive particles.

In another instance, the body 301 can have a profile ratio of at least about 0.04, wherein the profile ratio is defined as a ratio of the average difference in height [hc−hm] to the length (Lmiddle) of the shaped abrasive particle 300, defined as the absolute value of [(hc−hm)/(Lmiddle)]. It will be appreciated that the length (Lmiddle) of the body 301 can be the distance across the body 301 as illustrated in FIG. 3B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body 301 can have a particular rake angle, which may be defined as an angle between the bottom surface 304 and a side surface 305, 306, or 307 of the body 301. For example, the rake angle may be within a range between about 1° and about 80°. For other particles herein, the rake angle can be within a range between about 5° and 55°, such as between about 10° and about 50°, between about 15° and 50°, or even between about 20° and 50°. The formation of an abrasive particle having such a rake angle can improve the abrading capabilities of the abrasive particle 300. Notably, the rake angle can be within a range between any two rake angles noted above.

According to another embodiment, the shaped abrasive particles herein including, for example, the particles of FIGS. 3A and 3 B, can have an ellipsoidal region 317 in the upper surface 303 of the body 301. The ellipsoidal region 317 can be defined by a trench region 318 that can extend around the upper surface 303 and define the ellipsoidal region 317. The ellipsoidal region 317 can encompass the midpoint 381. Moreover, it is thought that the ellipsoidal region 317 defined in the upper surface 303 can be an artifact of the forming process, and may be formed as a result of the stresses imposed on the mixture 101 during formation of the shaped abrasive particles according to the methods described herein.

The shaped abrasive particle 300 can be formed such that the body 301 includes a crystalline material, and more particularly, a polycrystalline material. Notably, the polycrystalline material can include abrasive grains. In one embodiment, the body 301 can be essentially free of an organic material, including, for example, a binder. More particularly, the body 301 can consist essentially of a polycrystalline material.

In one aspect, the body 301 of the shaped abrasive particle 300 can be an agglomerate including a plurality of abrasive particles, grit, and/or grains bonded to each other to form the body 301 of the abrasive particle 300. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 300 is formed such that the abrasive grains forming the body 301 include alumina, and more particularly, may consist essentially of alumina. Moreover, in particular instances, the shaped abrasive particle 300 can be formed from a seeded sol-gel.

The abrasive grains (i.e., crystallites) contained within the body 301 may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body 301 can be at least about 0.01 microns, such as at least about 0.05 microns, such as at least about 0.08 microns, at least about 0.1 microns, or even at least about 0.5 microns. It will be appreciated that the abrasive grains can have an average grain size within a range between any of the minimum and maximum values noted above.

In accordance with certain embodiments, the abrasive particle 300 can be a composite article including at least two different types of grains within the body 301. It will be appreciated that different types of grains are grains having different compositions with regard to each other. For example, the body 301 can be formed such that is includes at least two different types of grains, wherein the two different types of grains can be nitrides, oxides, carbides, borides, oxynitrides, oxyborides, diamond, and a combination thereof.

In accordance with an embodiment, the abrasive particle 300 can have an average particle size, as measured by the largest dimension measurable on the body 301, of at least about 100 microns. In fact, the abrasive particle 300 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 300 can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

Figure 4:
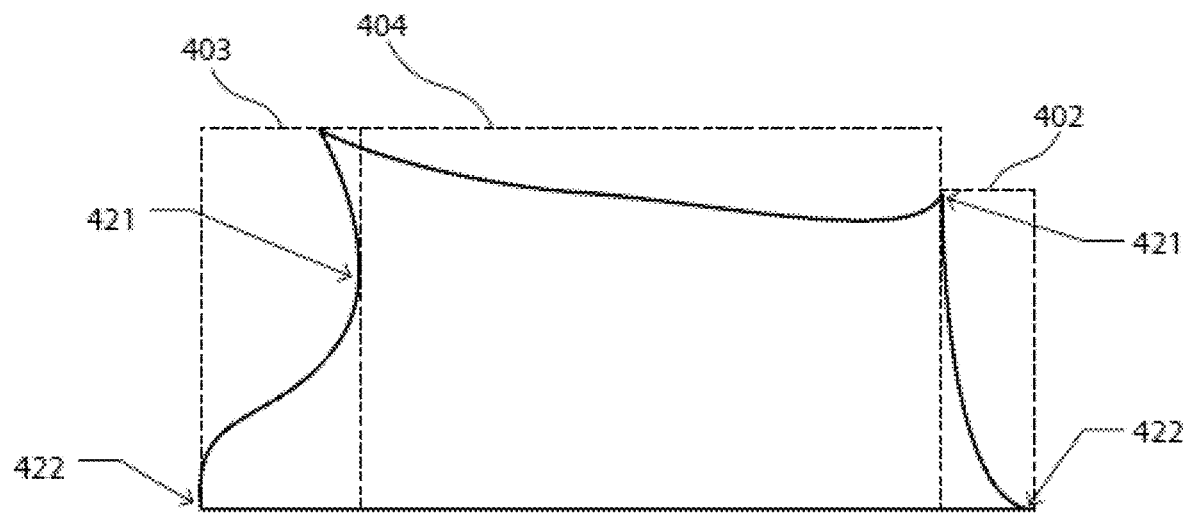
FIG. 4 includes a side view of a shaped abrasive particle and percentage flashing according to an embodiment.

The shaped abrasive particles of the embodiments herein can have a percent flashing that may facilitate improved performance. Notably, the flashing defines an area of the particle as viewed along one side, such as illustrated in FIG. 4, wherein the flashing extends from a side surface of the body 301 within the boxes 402 and 403. The flashing can represent tapered regions proximate to the upper surface 303 and bottom surface 304 of the body 301. The flashing can be measured as the percentage of area of the body 301 along the side surface contained within a box extending between an innermost point of the side surface (e.g., 421) and an outermost point (e.g., 422) on the side surface of the body 301. In one particular instance, the body 301 can have a particular content of flashing, which can be the percentage of area of the body 301 contained within the boxes 402 and 403 compared to the total area of the body 301 contained within boxes 402, 403, and 404. According to one embodiment, the percent flashing (f) of the body 301 can be at least about 1%. In another embodiment, the percent flashing can be greater, such as at least about 2%, at least about 3%, at least about 5%, at least about 8%, at least about 10%, at least about 12%, such as at least about 15%, at least about 18%, or even at least about 20%. Still, in a non-limiting embodiment, the percent flashing of the body 301 can be controlled and may be not greater than about 45%, such as not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, or even not greater than about 4%. It will be appreciated that the percent flashing of the body 301 can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle 300 on its side and viewing the body 301 at the side to generate a black and white image, such as illustrated in FIG. 4. A suitable program for such includes ImageJ software. The percentage flashing can be calculated by determining the area of the body 301 in the boxes 402 and 403 compared to the total area of the body 301 as viewed at the side (total shaded area), including the area in the center 404 and within the boxes. Such a procedure can be completed for a suitable sampling of particles to generate average, median, and/or and standard deviation values.

A batch of shaped abrasive particles, according to embodiments herein, may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body 301 as described above and "f" represents the percent flashing. In one particular instance, the height and flashing multiplier value (hiF) of the body 301 can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body 301 can be within a range between any of the above minimum and maximum values. Moreover, it will be appreciated that the above multiplier value can be representative of a median multiplier value (MhiF) for a batch of shaped abrasive particles.

A Fixed Abrasive Article

After forming or sourcing the shaped abrasive particles, the particles can be combined with other materials to form a fixed abrasive article. Some suitable exemplary fixed abrasive articles can include bonded abrasive articles wherein the shaped abrasive particles are contained in a three-dimensional matrix of bond material, and coated abrasive articles, wherein the shaped abrasive particles may be dispersed in a single-layer overlying a backing and bonded to the backing using one or more adhesive layers. , the particles may be combined with a backing to form a coated abrasive article.

Figure 5:
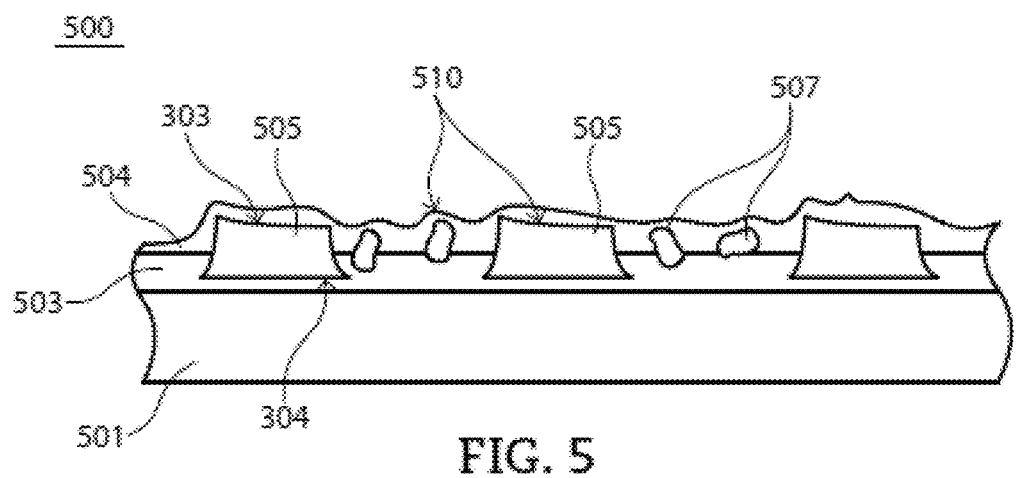
FIG. 5 includes a cross-sectional illustration of a portion of a coated abrasive article according to an embodiment.

FIG. 5 includes a cross-sectional illustration of a coated abrasive article in accordance with an embodiment. In particular, coated abrasive article 500 can include a substrate 501 (i.e., a backing) and at least one adhesive layer overlying a surface of the substrate 501. The adhesive layer can include a make coat 503 and/or a size coat 504. The coated abrasive 500 can include abrasive particulate material 510, which can include shaped abrasive particles 505 of the embodiments herein, and a second type of abrasive particulate material 507 in the form of diluent abrasive particles having a random shape, which may not necessarily be shaped abrasive particles. The make coat 503 can be overlying the surface of the substrate 501 and surrounding at least a portion of the shaped abrasive particles 505 and a second type of abrasive particulate material 507. The size coat 504 can be overlying and bonded to the shaped abrasive particles 505 and a second type of abrasive particulate material 507 and the make coat 503.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

A polymer formulation may be used to form any of a variety of layers of the abrasive article, such as, for example, a frontfill, a pre-size, the make coat, the size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins, including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes, and polyester acrylates, and acrylated monomers including monoacrylated, multiacrylated monomers. The formulation can also comprise a nonreactive thermoplastic resin binder which can enhance the self-sharpening characteristics of the deposited abrasive particles by enhancing the erodability. Examples of such thermoplastic resin include polypropylene glycol, polyethylene glycol, and polyoxypropylene-polyoxyethene block copolymer, etc. Use of a frontfill on the substrate 501 can improve the uniformity of the surface for suitable application of the make coat 503 and improved application and orientation of shaped abrasive particles 505 in a predetermined orientation.

The make coat 503 can be applied to the surface of the substrate 501 in a single process, or alternatively, the abrasive particulate material 510 can be combined with a make coat 503 material and applied as a mixture to the surface of the substrate 501. Suitable materials of the make coat 503 can include organic materials, particularly polymeric materials, including, for example, polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate material 510 can include shaped abrasive particles 505 according to embodiments herein. In particular instances, the abrasive particulate material 510 may include different types of shaped abrasive particles 505. The different types of shaped abrasive particles can differ from each other in composition, in two-dimensional shape, in three-dimensional shape, in size, and a combination thereof as described in the embodiments herein. As illustrated, the coated abrasive 500 can include a shaped abrasive particle 505 having a generally triangular two-dimensional shape.

The other type of abrasive particles 507 can be diluent particles different than the shaped abrasive particles 505. For example, the diluent particles can differ from the shaped abrasive particles 505 in composition, in two-dimensional shape, in three-dimensional shape, in size, and a combination thereof. For example, the abrasive particles 507 can represent conventional, crushed abrasive grit having random shapes. The abrasive particles 507 may have a median particle size less than the median particle size of the shaped abrasive particles 505.

After sufficiently forming the make coat 503 with the abrasive particulate material 510, the size coat 504 can be formed to overlie and bond the abrasive particulate material 510 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

According to one embodiment, the shaped abrasive particles 505 herein can be oriented in a predetermined orientation relative to each other and the substrate 501. While not completely understood, it is thought that one or a combination of dimensional features may be responsible for improved orientation of the shaped abrasive particles 505. According to one embodiment, the shaped abrasive particles 505 can be oriented in a flat orientation relative to the substrate 501, such as that shown in FIG. 5. In the flat orientation, the bottom surface 304 of the shaped abrasive particles can be closest to a surface of the substrate 501 (i.e., the backing), and the upper surface 303 of the shaped abrasive particles 505 can be directed away from the substrate 501 and configured to conduct initial engagement with a workpiece.

Figure 6:
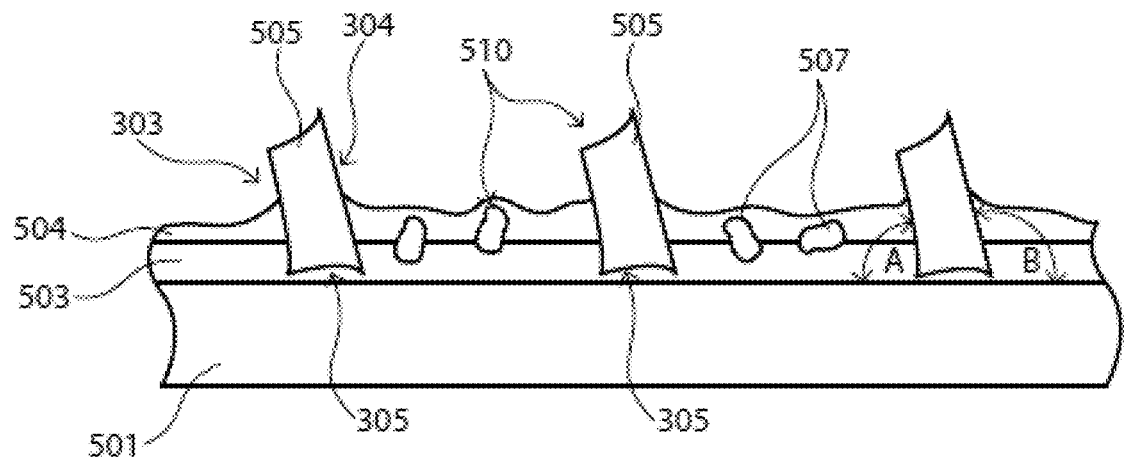
FIG. 6 includes a cross-sectional illustration of a portion of a coated abrasive article according to an embodiment.

According to another embodiment, the shaped abrasive particles 505 can be placed on a substrate 501 in a predetermined side orientation, such as that shown in FIG. 6. In particular instances, a majority of the shaped abrasive particles 505 of the total content of shaped abrasive particles 505 on the abrasive article 500 can have a predetermined and side orientation. In the side orientation, the bottom surface 304 of the shaped abrasive particles 505 can be spaced away and angled relative to the surface of the substrate 501. In particular instances, the bottom surface 304 can form an obtuse angle (B) relative to the surface of the substrate 501. Moreover, the upper surface 303 is spaced away and angled relative to the surface of the substrate 501, which in particular instances may define a generally acute angle (A). In a side orientation, a side surface (305, 306, or 307) can be closest to the surface of the substrate 501, and more particularly, may be in direct contact with a surface of the substrate 501.

For certain other abrasive articles herein, at least about 55% of the plurality of shaped abrasive particles 505 on the abrasive article 500 can have a predetermined side orientation. Still, the percentage may be greater, such as at least about 60%, at least about 65%, at least about 70%, at least about 75%, at least about 77%, at least about 80%, at least about 81%, or even at least about 82%. And for one non-limiting embodiment, an abrasive article 500 may be formed using the shaped abrasive particles 505 herein, wherein not greater than about 99% of the total content of shaped abrasive particles have a predetermined side orientation.

To determine the percentage of particles in a predetermined orientation, a 2D microfocus x-ray image of the abrasive article 500 is obtained using a CT scan machine run in the conditions of Table 1 below. The X-ray 2D imaging was conducted on RB214 with Quality Assurance software. A specimen mounting fixture utilizes a plastic frame with a 4"×4" window and an Ø0.5" solid metallic rod, the top part of which is half flattened with two screws to fix the frame. Prior to imaging, a specimen was clipped over one side of the frame where the screw heads were faced with the incidence direction of the X-rays. Then five regions within the 4"×4" window area are selected for imaging at 120 kV/80 μA. Each 2D projection was recorded with the X-ray off-set/gain corrections and at a magnification of 15 times.

TABLE 1

| Voltage (kV) | Current (μA) | Magnification | Field of view per image (mm × mm) | Exposure time |
|---|---|---|---|---|
| 120 | 80 | 15X | 16.2 × 13.0 | 500 ms/ 2.0 fps |

The image is then imported and analyzed using the ImageJ program, wherein different orientations are assigned values according to Table 2 below. FIG. 13 includes images representative of portions of a coated abrasive according to an embodiment and used to analyze the orientation of shaped abrasive particles on the backing.

TABLE 2

| Cell marker type | Comments |
|---|---|
| 1 | Grains on the perimeter of the image, partially exposed - standing up |
| 2 | Grains on the perimeter of the image, partially exposed - down |
| 3 | Grains on the image, completely exposed - standing vertical |
| 4 | Grains on the image, completely exposed - down |
| 5 | Grains on the image, completely exposed - standing slanted (between standing vertical and down) |

Three calculations are then performed as provided below in Table 3. After conducting the calculations, the percentage of grains in a particular orientation (e.g., side orientation) per square centimeter can be derived.

TABLE 3

| 5) Parameter | Protocol* |
|---|---|
| % grains up | ((0.5 × 1) + 3 + 5)/ (1 + 2 + 3 + 4 + 5) |
| Total # of grains per cm² | (1 + 2 + 3 + 4 + 5) |
| # of grains up per cm² | (% grains up × Total # of grains per cm²) |

*These are all normalized with respect to the representative area of the image.
+A scale factor of 0.5 was applied to account for the fact that they are not completely present in the image.

Furthermore, the abrasive articles made with the shaped abrasive particles can utilize various contents of the shaped abrasive particles. For example, the abrasive articles can be coated abrasive articles including a single layer of the shaped abrasive particles in an open-coat configuration or a closed-coat configuration. For example, the plurality of shaped abrasive particles can define an open-coat abrasive product having a coating density of shaped abrasive particles of not greater than about 70 particles/cm². In other instances, the open-coat density of shaped abrasive particle per square centimeter of abrasive article may be not greater than about 65 particles/cm², such as not greater than about 60 particles/cm², not greater than about 55 particles/cm², or even not greater than about 50 particles/cm². Still, in one non-limiting embodiment, the density of the open-coat coated abrasive using the shaped abrasive particle herein can be at least about 5 particles/cm², or even at least about 10 particles/cm². It will be appreciated that the open-coat density of the coated abrasive article can be within a range between any of the above minimum and maximum values.

In an alternative embodiment, the plurality of shaped abrasive particles can define a closed-coat abrasive product having a coating density of shaped abrasive particles of at least about 75 particles/cm², such as at least about 80 particles/cm², at least about 85 particles/cm², at least about 90 particles/cm², at least about 100 particles/cm². Still, in one non-limiting embodiment, the closed-coat density of the coated abrasive using the shaped abrasive particle herein can be not greater than about 500 particles/cm². It will be appreciated that the closed coat density of the coated abrasive article can be within a range between any of the above minimum and maximum values.

In certain instances, the abrasive article can have an open-coat density of a coating not greater than about 50% of abrasive particles covering the exterior abrasive surface of the article. In other embodiments, the percentage coating of the abrasive particles relative to the total area of the abrasive surface can be not greater than about 40%, not greater than about 30%, not greater than about 25%, or even not greater than about 20%. Still, in one non-limiting embodiment, the percentage coating of the abrasive particles relative to the total area of the abrasive surface can be at least about 5%, such as at least about 10%, at least about 15%, at least about 20%, at least about 25%, at least about 30%, at least about 35%, or even at least about 40%. It will be appreciated that the percent coverage of shaped abrasive particles for the total area of abrasive surface can be within a range between any of the above minimum and maximum values.

Some abrasive articles may have a particular content of abrasive particles for a length (e.g., ream) of the backing or the substrate 501. For example, in one embodiment, the abrasive article may utilize a normalized weight of shaped abrasive particles of at least about 20 lbs/ream, such as at least about 25 lbs/ream, or even at least about 30 lbs/ream. Still, in one non-limiting embodiment, the abrasive articles can include a normalized weight of shaped abrasive particles of not greater than about 60 lbs/ream, such as not greater than about 50 lbs/ream, or even not greater than about 45 lbs/ream. It will be appreciated that the abrasive articles of the embodiments herein can utilize a normalized weight of shaped abrasive particles within a range between any of the above minimum and maximum values.

The plurality of shaped abrasive particles on an abrasive article as described herein can define a first portion of a batch of abrasive particles, and the features described in the embodiments herein can represent features that are present in at least a first portion of a batch of shaped abrasive particles. Moreover, according to an embodiment, control of one or more process parameters as already described herein also can control the prevalence of one or more features of the shaped abrasive particles of the embodiments herein. The provision of one or more features of any shaped abrasive particle of a batch may facilitate alternative or improved deployment of the particles in an abrasive article and may further facilitate improved performance or use of the abrasive article. The batch may also include a second portion of abrasive particles. The second portion of abrasive particles can include diluent particles.

In accordance with one aspect of the embodiments herein, a fixed abrasive article can include a blend of abrasive particles. The blend of abrasive particles can include a first type of shaped abrasive particle and a second type of shaped abrasive particle. In particular instances, the first type of shaped abrasive particle can be defined by a first height (h1). It will be appreciated that reference to the first height can include any height dimension identified in the embodiments herein, including, for example, but not limited to, a median interior height (Mhi) of the first type of shaped abrasive particle. Moreover, the second type of shaped abrasive particle can be defined by a second height (h2). It will be appreciated that reference to the second height can include any height dimension identified in the embodiments herein, including, for example, but not limited to, a median interior height (Mhi) of the second type of shaped abrasive particle.

In accordance with one embodiment, the second type of shaped abrasive particle can have a second height (h2) that is less than the first height (h1). More particularly, in certain instances, the blend of abrasive particles can have a height ratio (h2/h1) that can describe the second height (h2) of the second type of shaped abrasive particle of the blend divided by the first height (h1) of the first type of shaped abrasive particle of the blend. Certain height ratios of the blend may improve performance of the abrasive article. For at least one embodiment, the height ratio (h2/h1) can be not greater than about 0.98. In other instances, the height ratio (h2/h1) can be not greater than about 0.95, such as not greater than about 0.93, not greater than about 0.90, not greater than about 0.88, not greater than about 0.85, or even not greater than about 0.83. Still, in another non-limiting embodiment, the height ratio (h2/h1) can be at least about 0.05, such as at least about 0.08, at least about 0.1, at least about 0.12, at least about 0.15, at least about 0.18, at least about 0.2, at least about 0.22, at least about 0.25, at least about 0.28, at least about 0.3, at least about 0.32, at least about 0.35, at least about 0.4, at least about 0.45, at least about 0.5, at least about 0.55, at least about 0.6, or even at least about 0.65. It will be appreciated that the height ratio (h2/h1) of the blend, including the first type of shaped abrasive particle and the second type of shaped abrasive particle, can be within a range between any of the minimum and maximum values noted above.

In certain instances, the blend of abrasive particles may define a particular height difference (h1–h2) between the first height and the second height that may facilitate improved performance of the fixed abrasive article. As indicated, the height difference may define a numerical value of a difference between the second height (h2) subtracted from the first height (h1). For example, the blend may have a height difference (h1–h2) of at least about 1 micron. In accordance with another embodiment, the height difference (h1–h2) can be at least about 5 microns. In other instances, the height difference may be greater, such as at least about 10 microns, at least about 15 microns, at least about 20 microns, at least about 25 microns, at least about 30 microns, at least about 35 microns, at least about 40 microns, at least about 50 microns, at least about 60 microns, at least about 70 microns, or even at least about 80 microns. Still, in one non-limiting embodiment, the height difference (h1−h2) may be not greater than about 2 mm, such as not greater than about 1 mm, not greater than about 800 microns, or even not greater than about 500 microns. It will be appreciated that the height difference (h1−h2) may be within a range between any of the minimum and maximum values noted above.

As described herein, the shaped abrasive particles of the embodiments herein may have a body defined by a length, width, and height. In accordance with an embodiment, the first type of shaped abrasive particle may have a first length, and a second type of shaped abrasive particle may have a second length. Moreover, the blend of abrasive particles may have a length ratio (l2/l1) that can describe the second length (l2) of the second type of shaped abrasive particle of the blend divided by the first length (l1) of the first type of shaped abrasive particle of the blend. Certain length ratios of the blend may facilitate improved performance of the abrasive article. Accordingly, in certain instances, the first type of shaped abrasive particle may have a first length that is different than the second length corresponding to the second type of shaped abrasive particle. However, it will be appreciated that the first length of the first type of shaped abrasive particle can be substantially the same as the second length of the second type of shaped abrasive particle.

In at least one embodiment, the length ratio (l2/l1) can be at least about 0.05, such as at least about 0.08, at least about 0.1, at least about 0.12, at least about 0.15, at least about 0.18, at least about 0.2, at least about 0.22, at least about 0.25, at least about 0.28, at least about 0.3, at least about 0.32, at least about 0.35, at least about 0.4, at least about 0.45, at least about 0.5, at least about 0.55, at least about 0.6, at least about 0.65, at least about 0.7, at least about 0.75, at least about 0.8, at least about 0.9, or even at least about 0.95. Still, in one non-limiting embodiment, the length ratio (l2/l1) may be not greater than about 10, such as, not greater than about 8, not greater than about 6, not greater than about 5, not greater than about 4, not greater than about 3, not greater than about 2, not greater than about 1.8, not greater than about 1.5, or even not greater than about 1.2. It will be appreciated that the length ratio (l2/l1) may be within a range between any of the minimum and maximum values noted above.

Furthermore, the blend of abrasive particles may define a particular length difference (l1−l2), which can define a difference in the first length of the first type of shaped abrasive particle of the blend relative to the second length of the second type of shaped abrasive particle of the blend, and which may facilitate improved performance of the abrasive article. For example, in one embodiment, the length difference (l1−l2) may be not greater than about 2 mm, such as not greater than about 1 mm, not greater than about 800 microns, not greater than about 500 microns, not greater than about 300 microns, not greater than about 100 microns, or even not greater than about 50 microns. Still, in one non-limiting embodiment, the length difference (l1−l2) may be at least about 1 micron, such as at least about 5 microns, or even at least about 10 microns. It will be appreciated that the length difference (l1−l2) may be within a range between any of the minimum and maximum values noted above.

As noted herein, the first type of shaped abrasive particle may have a body defining a first width (w1). Moreover, the second type of shaped abrasive particle may have a body defining a second width (w2). Furthermore, the blend of abrasive particles may have a width ratio (w2/w1) that can describe the second width (w2) of the second type of shaped abrasive particle of the blend divided by the first width (w1) of the first type of shaped abrasive particle of the blend. Certain width ratios of the blend may facilitate improved performance of the abrasive article. Accordingly, in certain instances, the first type of shaped abrasive particle may have a first width that is different than the second width corresponding to the second type of shaped abrasive particle. However, it will be appreciated that the first width of the first type of shaped abrasive particle can be substantially the same as the second width of the second type of shaped abrasive particle.

In one particular embodiment, the width ratio (w2/w1) may be at least about 0.08, such as at least about 0.1, at least about 0.12, at least about 0.15, at least about 0.18, at least about 0.2, at least about 0.22, at least about 0.25, at least about 0.28, at least about 0.3, at least about 0.32, at least about 0.35, at least about 0.4, at least about 0.45, at least about 0.5, at least about 0.55, at least about 0.6, at least about 0.65, at least about 0.7, at least about 0.75, at least about 0.8, at least about 0.9, or even at least about 0.95. Still, in another non-limiting embodiment, the width ratio (w2/w1) may be not greater than about 10, such as not greater than about 8, not greater than about 6, not greater than about 5, not greater than about 4, not greater than about 3, not greater than about 2, not greater than about 1.8, not greater than about 1.5, or even not greater than about 1.2. It will be appreciated that the width ratio (w2/w1) may be within a range between any of the minimum and maximum values noted above.

Moreover, the blend of abrasive particles may have a width difference (w1−w2) that may define a difference in width between the first type of shaped abrasive particle of the blend and the width of the second type of shaped abrasive particle of the blend, and which may facilitate improved performance of the abrasive article. In at least one embodiment, the width difference (w1−w2) may be not greater than about 2 mm, such as not greater than about 1 mm, not greater than about 800 microns, not greater than about 500 microns, not greater about 300 microns, not greater than about 100 microns, or even not greater than about 50 microns. Still, in at least one non-limiting embodiment, the width difference (w1−w2) can be at least about 1 micron, such as at least about 5 microns, or even at least about 10 microns. It will be appreciated that the width difference can be within a range between any of the minimum and maximum values noted above.

In accordance with another aspect, the blend of abrasive particles can include a first type of shaped abrasive particle present in a first content (C1), which may be expressed as a percentage (e.g., a weight percent) of the first type of shaped abrasive particles as compared to the total content of particles of the blend. Furthermore, the blend of abrasive particles may include a second content (C2) of the second type of shaped abrasive particles, expressed as a percentage (e.g., a weight percent) of the second type of shaped abrasive particles relative to the total weight of the blend. In at least one embodiment, the first content can be different than the second content. More particularly, in at least one embodiment, the first content can be less than the second content.

For example, in certain instances, the blend can be formed such that the first content (C1) can be not greater than about 90% of the total content of the blend. In another embodiment, the first content may be less, such as not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the first content of the first type of shaped abrasive particles may be present in at least about 1% of the total content of abrasive particles of the blend. In yet other instances, the first content (C1) may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the first content (C1) may be present within a range between any of the minimum and maximum percentages noted above.

The blend of abrasive particles may include a particular content of the second type of shaped abrasive particle. For example, the second content (C2) may be not greater than about 98% of the total content of the blend. In other embodiments, the second content may be not greater than about 95%, such as not greater than about 90%, not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the second content (C2) may be present in an amount of at least about 1% of the total content of the blend. For example, the second content may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the second content (C2) can be within a range between any of the minimum and maximum percentages noted above.

In accordance with another embodiment, the blend of abrasive particles may have a blend ratio (C1/C2) that may define a ratio between the first content (C1) and the second content (C2). For example, in one embodiment, the blend ratio (C1/C2) may be not greater than about 10. In yet another embodiment, the blend ratio (C1/C2) may be not greater than about 8, such as not greater than about 6, not greater than about 5, not greater than about 4, not greater than about 3, not greater than about 2, not greater than about 1.8, not greater than about 1.5, not greater than about 1.2, not greater than about 1, not greater than about 0.9, not greater than about 0.8, not greater than about 0.7, not greater than about 0.6, not greater than about 0.5, not greater than about 0.4, not greater than about 0.3, or even not greater than about 0.2. Still, in another non-limiting embodiment, the blend ratio (C1/C2) may be at least about 0.1, such as at least about 0.15, at least about 0.2, at least about 0.22, at least about 0.25, at least about 0.28, at least about 0.3, at least about 0.32, at least about 0.3, at least about 0.4, at least about 0.45, at least about 0.5, at least about 0.55, at least about 0.6, at least about 0.65, at least about 0.7, at least about 0.75, at least about 0.8, at least about 0.9, at least about 0.95, at least about 1, at least about 1.5, at least about 2, at least about 3, at least about 4, or even at least about 5. It will be appreciated that the blend ratio (C1/C2) may be within a range between any of the minimum and maximum values noted above.

In at least one embodiment, the blend of abrasive particles can include a majority content of shaped abrasive particles. That is, the blend can be formed primarily of shaped abrasive particles, including, but not limited to, a first type of shaped abrasive particle and a second type of shaped abrasive particle. In at least one particular embodiment, the blend of abrasive particles can consist essentially of the first type of shaped abrasive particle and the second type of shaped abrasive particle. However, in other non-limiting embodiments, the blend may include other types of abrasive particles. For example, the blend may include a third type of abrasive particle that may include a conventional abrasive particle or a shaped abrasive particle. The third type of abrasive particle may include a diluent type of abrasive particle having an irregular shape, which may be achieved through conventional crushing and comminution techniques.

For at least one aspect, a fixed abrasive article according to an embodiment can include a blend of abrasive particles including a first type of shaped abrasive particle and a second type of shaped abrasive particle, wherein the fixed abrasive article comprises a stainless steel lifespan of at least about 11 in$^3$. The stainless steel lifespan of a fixed abrasive article can be determined according to the standard stainless steel grinding characterization test as defined herein. In one embodiment, the fixed abrasive article can have a stainless steel lifespan of at least about 11.5 in$^3$, such as at least about 12 in$^3$. Still, in another non-limiting embodiment, the fixed abrasive article can have a stainless steel lifespan of not greater than about 25 in$^3$, such as not greater than about 20 in$^3$. It will be appreciated that a fixed abrasive article according to an embodiment can have a stainless steel lifespan within a range between and including any of the minimum and maximum values noted above.

According to another embodiment, the blend of abrasive particles can include a plurality of shaped abrasive particles, and each of the shaped abrasive particles of the plurality may be arranged in a controlled orientation relative to a backing. Suitable exemplary controlled orientations can include at least one of a predetermined rotational orientation, a predetermined lateral orientation, and a predetermined longitudinal orientation. In at least one embodiment, the plurality of shaped abrasive particles having a controlled orientation can include at least a portion of the first type of shaped abrasive particles of the blend, at least a portion of the second type of shaped abrasive particles of the blend, and a combination thereof. More particularly, the plurality of shaped abrasive particles having a controlled orientation can include all of the first type of shaped abrasive particles. In still another embodiment, the plurality of shaped abrasive particles arranged in a controlled orientation relative to the backing may include all of the second type of shaped abrasive particles within the blend of abrasive particles.

Figure 7:
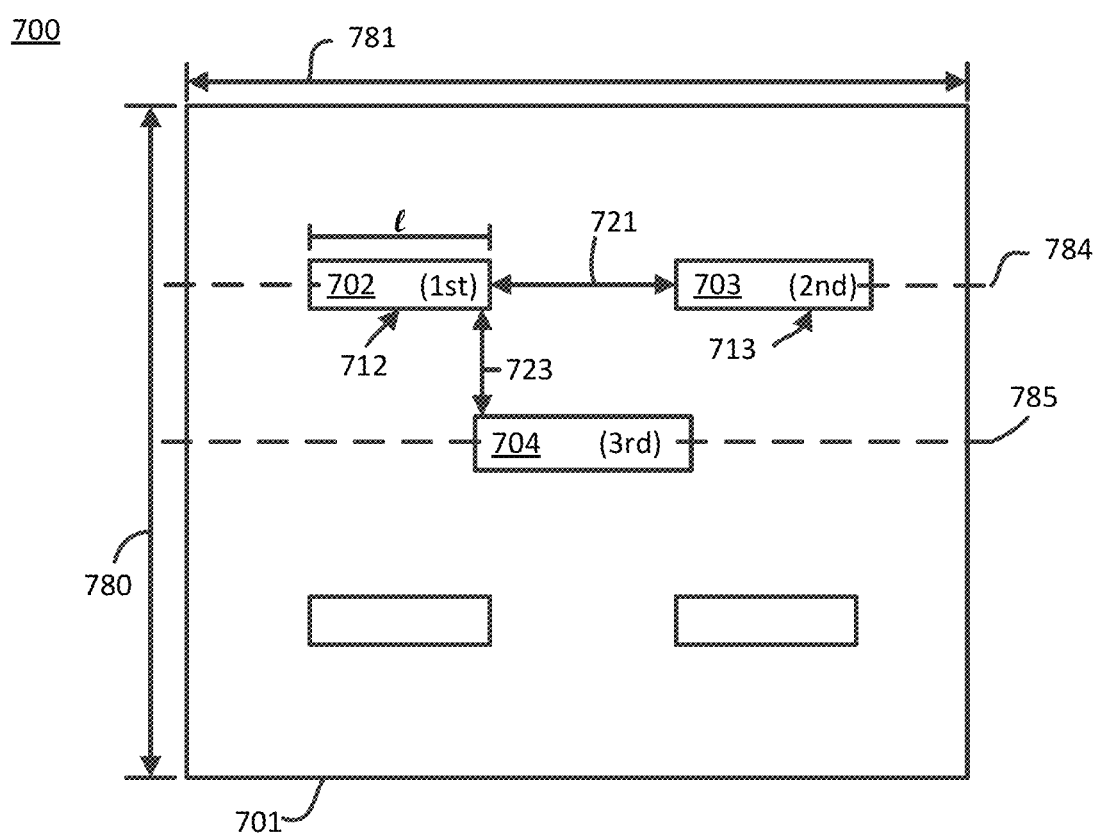
FIG. 7 includes a top-down illustration of a portion of a coated abrasive article according to an embodiment.

FIG. 7 includes a top view illustration of a portion of a coated abrasive article, including shaped abrasive particles having controlled orientation. As illustrated, the coated abrasive article 700 includes a backing 701 that can be defined by a longitudinal axis 780 that extends along and defines a length of the backing 701 and a lateral axis 781 that extends along and defines a width of the backing 701. In accordance with an embodiment, a shaped abrasive particle 702 can be located in a first, predetermined position 712 defined by a particular first lateral position relative to the lateral axis of 781 of the backing 701 and a first longitudinal position relative to the longitudinal axis 780 of the backing 701. Furthermore, a shaped abrasive particle 703 may have a second, predetermined position 713 defined by a second lateral position relative to the lateral axis 781 of the backing 701, and a first longitudinal position relative to the longitudinal axis 780 of the backing 701 that is substantially the same as the first longitudinal position of the shaped abrasive particle 702. Notably, the shaped abrasive particles 702 and 703 may be spaced apart from each other by a lateral space 721, defined as a smallest distance between the two adjacent shaped abrasive particles 702 and 703 as measured along a lateral plane 784 parallel to the lateral axis 781 of the backing 701. In accordance with an embodiment, the lateral space 721 can be greater than zero, such that some distance exists between the shaped abrasive particles 702 and 703. However, while not illustrated, it will be appreciated that the lateral space 721 can be zero, allowing for contact and even overlap between portions of adjacent shaped abrasive particles.

As further illustrated, the coated abrasive article 700 can include a shaped abrasive particle 704 located at a third, predetermined position 714 defined by a second longitudinal position relative to the longitudinal axis 780 of the backing 701 and also defined by a third lateral position relative to a lateral plane 785 parallel to the lateral axis 781 of the backing 701 and spaced apart from the lateral axis 784. Further, as illustrated, a longitudinal space 723 may exist between the shaped abrasive particles 702 and 704, which can be defined as a smallest distance between the two adjacent shaped abrasive particles 702 and 704 as measured in a direction parallel to the longitudinal axis 780. In accordance with an embodiment, the longitudinal space 723 can be greater than zero. Still, while not illustrated, it will be appreciated that the longitudinal space 723 can be zero, such that the adjacent shaped abrasive particles are touching or even overlapping each other.

Figure 8A:
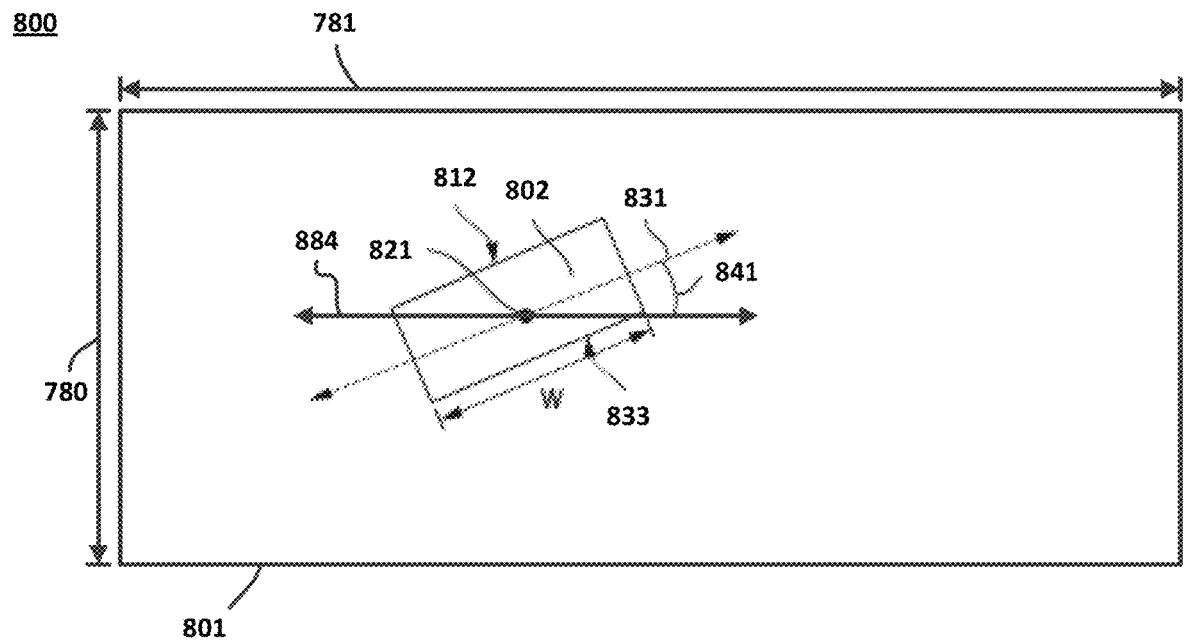
FIG. 8A includes a top-down illustration of a portion of a coated abrasive article according to an embodiment.

FIG. 8A includes a top view illustration of a portion of an abrasive article, including shaped abrasive particles in accordance with an embodiment. As illustrated, the abrasive article 800 can include a shaped abrasive particle 802 overlying a backing 801 in a first position having a first rotational orientation relative to a lateral axis 781 defining the width of the backing 801. In particular, the shaped abrasive particle 802 can have a predetermined rotational orientation defined by a first rotational angle between a lateral plane 884 parallel to the lateral axis 781 and a dimension of the shaped abrasive particle 802. Notably, reference herein to a dimension of the shaped abrasive particle 802 can include reference to a bisecting axis 831 of the shaped abrasive particle 802, such bisecting axis 831 extending through a center point 821 of the shaped abrasive particle 802 along a surface (e.g., a side or an edge) connected to (directly or indirectly) the backing 801. Accordingly, in the context of a shaped abrasive particle positioned in a side orientation (see, e.g., FIG. 6), the bisecting axis 831 can extend through a center point 821 and in the direction of the width (w) of a side 833 closest to the surface of the backing 801.

In certain embodiments, the predetermined rotational orientation of the shaped abrasive particle 802 can be defined by a predetermined rotational angle 841 that defines the smallest angle between the bisecting axis 831 and the lateral plane 884, both of which extend through the center point 821 as viewed from the top down in FIG. 8A. In accordance with an embodiment, the predetermined rotational angle 841, and thus the predetermined rotational orientation, can be 0°. In other embodiments, the predetermined rotational angle defining the predetermined rotational orientation can be greater, such as at least about 2°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation as defined by the rotational angle 841 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation can be within a range between any of the above minimum and maximum angles.

Figure 8B:
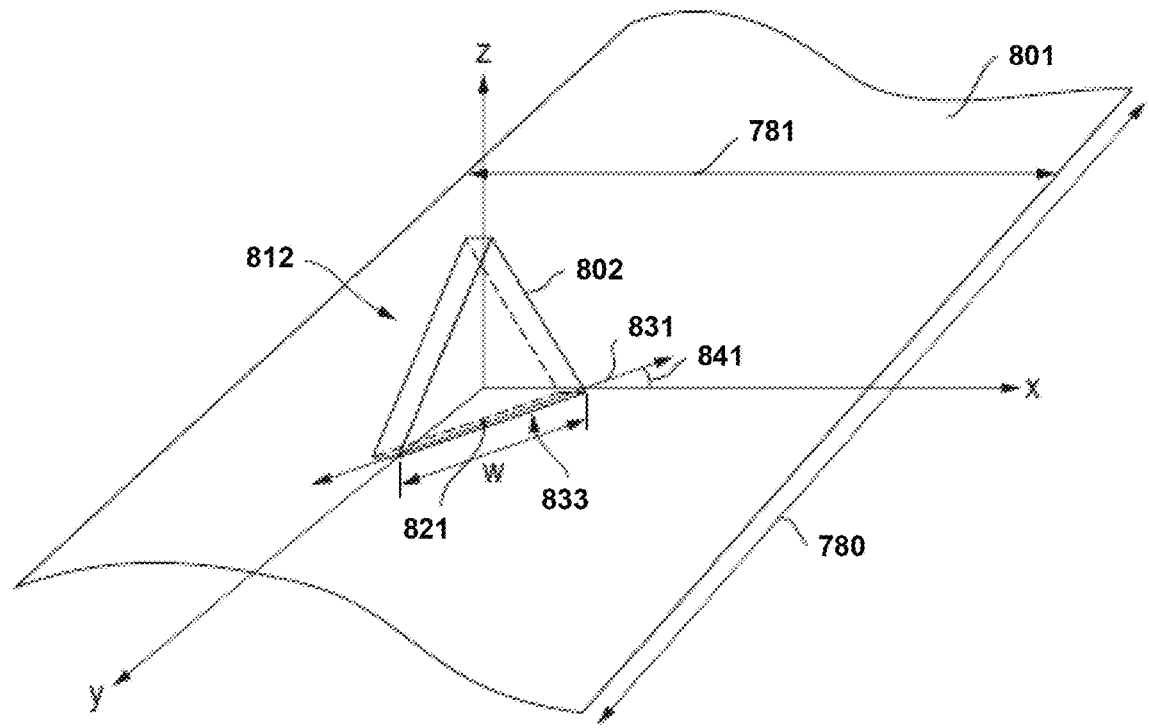
FIG. 8B includes a perspective view illustration of a portion of a coated abrasive article according to an embodiment.

FIG. 8B includes a perspective view illustration of a portion of the abrasive article 800, including the shaped abrasive particle 802 in accordance with an embodiment. As illustrated, the abrasive article 800 can include the shaped abrasive particle 802 overlying the backing 801 in a first position 812 such that the shaped abrasive particle 802 includes a first rotational orientation relative to the lateral axis 781 defining the width of the backing 801. Certain aspects of the predetermined orientation of a shaped abrasive particle may be described by reference to a x, y, z three-dimensional axis as illustrated. For example, the predetermined longitudinal orientation of the shaped abrasive particle 802 may be described by reference to the position of the shaped abrasive particle 802 relative to the y-axis, which extends parallel to the longitudinal axis 780 of the backing 801. Moreover, the predetermined lateral orientation of the shaped abrasive particle 802 may be described by reference to the position of the shaped abrasive particle on the x-axis, which extends parallel to the lateral axis 781 of the backing 801. Furthermore, the predetermined rotational orientation of the shaped abrasive particle 802 may be defined with reference to a bisecting axis 831 that extends through the center point 821 of the side 833 of the shaped abrasive particle 802. Notably, the side 833 of the shaped abrasive particle 802 may be connected either directly or indirectly to the backing 801. In a particular embodiment, the bisecting axis 831 may form an angle with any suitable reference axis, including, for example, the x-axis that extends parallel to the lateral axis 781. The predetermined rotational orientation of the shaped abrasive particle 802 may be described as a rotational angle formed between the x-axis and the bisecting axis 831, which rotational angle is depicted in FIG. 8B as angle 841. Notably, the controlled placement of a plurality of shaped abrasive particles on the backing of the abrasive article, which placement facilitates control of the predetermined orientation characteristics described herein, is a highly involved process that has not previously been contemplated or deployed in the industry.

Figure 9:
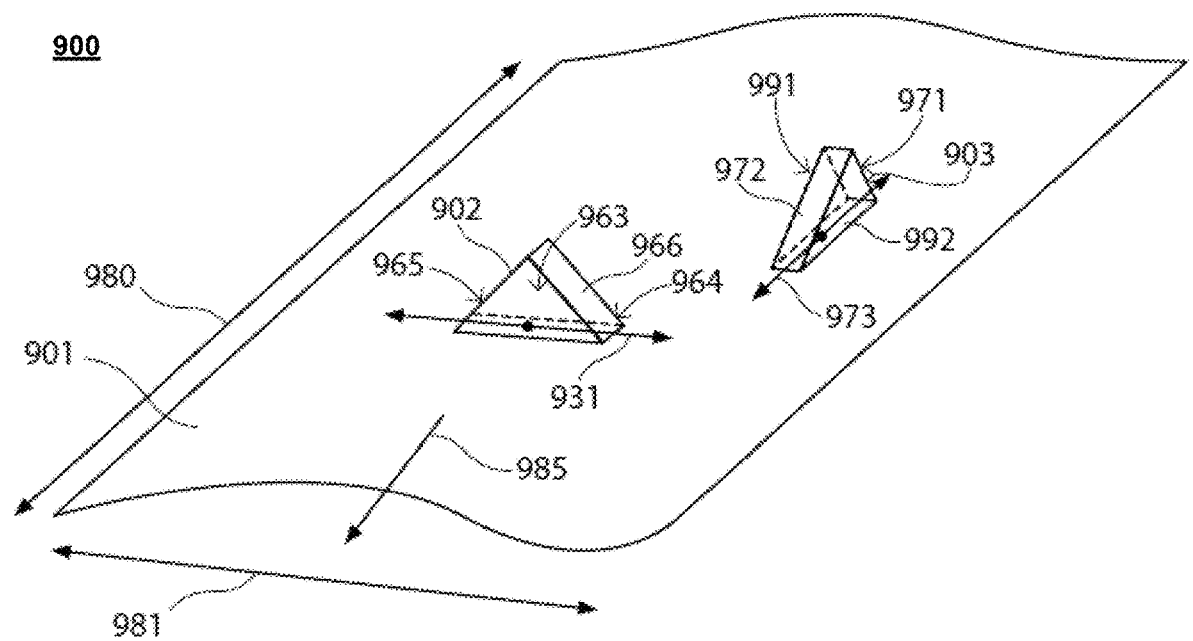
FIG. 9 includes a perspective view illustration of a portion of a coated abrasive article according to an embodiment.

FIG. 9 includes a perspective view illustration of a portion of an abrasive article, including shaped abrasive particles having predetermined orientation characteristics relative to a grinding direction in accordance with an embodiment. In one embodiment, the abrasive article 900 can include a shaped abrasive particle 902 having a predetermined orientation relative to another shaped abrasive particle 903 and/or relative to a grinding direction 985. The grinding direction 985 may be an intended direction of movement of the abrasive article relative to a workpiece in a material removal operation. In particular instances, the grinding direction 985 may be defined relative to the dimensions of the backing 901. For example, in one embodiment, the grinding direction 985 may be substantially perpendicular to the lateral axis 981 of the backing and substantially parallel to the longitudinal axis 980 of the backing 901. The predetermined orientation characteristics of the shaped abrasive particle 902 may define an initial contact surface of the shaped abrasive particle 902 with a workpiece. For example, the shaped abrasive particle 902 can include major surfaces 963 and 964 and side surfaces 965 and 966, each of which can extend between the major surfaces 963 and 964. The predetermined orientation characteristics of the shaped abrasive particle 902 can position the particle 902 such that the major surface 963 is configured to make initial contact with a workpiece before the other surfaces of the shaped abrasive particle 902 during a material removal operation. Such an orientation may be considered a major surface orientation relative to the grinding direction 985. More particularly, the shaped abrasive particle 902 can have a bisecting axis 931 having a particular orientation relative to the grinding direction 985. For example, as illustrated, the vector of the grinding direction 985 and the bisecting axis 931 are substantially perpendicular to each other. It will be appreciated that, just as any range of predetermined rotational orientations relative to the backing are contemplated for a shaped abrasive particle, any range of orientations of the shaped abrasive particles relative to the grinding direction 985 are contemplated and can be utilized.

The shaped abrasive particle 903 can have one or more different predetermined orientation characteristics as compared to the shaped abrasive particle 902 and the grinding direction 985. As illustrated, the shaped abrasive particle 903 can include major surfaces 991 and 992, each of which can be joined by side surfaces 971 and 972. Moreover, as illustrated, the shaped abrasive particle 903 can have a bisecting axis 973 forming a particular angle relative to the vector of the grinding direction 985. As illustrated, the bisecting axis 973 of the shaped abrasive particle 903 can have a substantially parallel orientation with the grinding direction 985 such that the angle between the bisecting axis 973 and the grinding direction 985 is essentially 0 degrees. Accordingly, the predetermined orientation characteristics of the shaped abrasive particle 903 facilitate initial contact of the side surface 972 with a workpiece before any of the other surfaces of the shaped abrasive particle 903. Such an orientation of the shaped abrasive particle 903 may be considered a side surface orientation relative to the grinding direction 985.

Still, in one non-limiting embodiment, it will be appreciated that an abrasive article can include one or more groups of shaped abrasive particles that can be arranged in one or more predetermined distributions relative to the backing, a grinding direction, and/or each other. For example, one or more groups of shaped abrasive particles, as described herein, can have a predetermined orientation relative to a grinding direction. Moreover, the abrasive articles herein can have one or more groups of shaped abrasive particles, each of the groups having a different predetermined orientation relative to a grinding direction. Utilization of groups of shaped abrasive particles having different predetermined orientations relative to a grinding direction can facilitate improved performance of the abrasive article.

Figure 10:
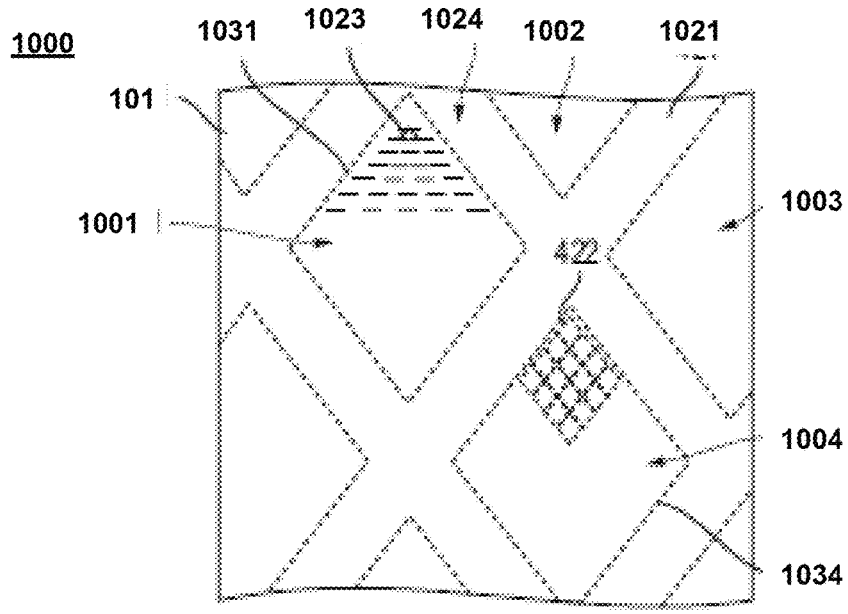
FIG. 10 includes a top view illustration of a portion of an abrasive article in accordance with an embodiment.

FIG. 10 includes a top view illustration of a portion of an abrasive article in accordance with an embodiment. In particular, the abrasive article 1000 can include a first group 1001 including a plurality of shaped abrasive particles. As illustrated, the shaped abrasive particles can be arranged relative to each other on the backing 101 to define a predetermined distribution. More particularly, the predetermined distribution can be in the form of a pattern 1023 as viewed top-down, and more particularly defining a triangular-shaped two-dimensional array. As further illustrated, the first group 1001 can be arranged on the abrasive article 1000 defining a predetermined macro-shape 1031 overlying the backing 101. In accordance with an embodiment, the macro-shape 1031 can have a particular two-dimensional shape as viewed top-down. Some exemplary two-dimensional shapes can include polygons, ellipsoids, numerals, Greek alphabet characters, Latin alphabet characters, Russian alphabet characters, Arabic alphabet characters, Kanji characters, complex shapes, irregular shapes, designs, any combination thereof. In particular instances, the formation of a group having a particular macro-shape may facilitate improved performance of the abrasive article.

As further illustrated, the abrasive article 1000 can include a group 1004 including a plurality of shaped abrasive particles, which can be arranged on the surface of the backing 101 relative to each other to define a predetermined distribution. Notably, the predetermined distribution can include an arrangement of the plurality of the shaped abrasive particles that define a pattern 1024, and more particularly, a generally quadrilateral pattern. As illustrated, the group 1004 can define a macro-shape 1034 on the surface of the abrasive article 1000. In one embodiment, the macro-shape 1034 of the group 1004 can have a two-dimensional shape as viewed top-down, including, for example, a polygonal shape, and more particularly, a generally quadrilateral (diamond) shape as viewed top down on the surface of the abrasive article 1000. In the illustrated embodiment of FIG. 10, the group 1001 can have a macro-shape 1031 that is substantially the same as the macro-shape 1034 of the group 1004. However, it will be appreciated that in other embodiments, various different groups can be used on the surface of the abrasive article, and more particularly, wherein each of the different groups has a different macro-shape relative to each other.

As further illustrated, the abrasive article can include groups 1001, 1002, 1003, and 1004 which can be separated by channel regions 1021 and 1022 extending between the groups 1001-1004. In particular instances, the channel regions 1021 and 1022 can be substantially free of shaped abrasive particles. Moreover, the channel regions 1021 and 1022 may be configured to move liquid between the groups 1001-1004 and further improve swarf removal and grinding performance of the abrasive article. Furthermore, in a certain embodiment, the abrasive article 1000 can include channel regions 1021 and 1022 extending between groups 1001-1004, wherein the channel regions 1021 and 1022 can be patterned on the surface of the abrasive article 1000. In particular instances, the channel regions 1021 and 1022 can represent a regular and repeating array of features extending along a surface of the abrasive article.

The fixed abrasive articles of the embodiments herein can be utilized in various material removal operations. For example, fixed abrasive articles herein can be used in methods of removing material from a workpiece by moving the fixed abrasive article relative to the workpiece. The relative movement between the fixed abrasive and the workpiece can facilitate removal of the material from the surface of the workpiece. Various workpieces can be modified using the fixed abrasive articles of the embodiments herein, including but not limited to, workpieces comprising inorganic materials, organic materials, and a combination thereof. In a particular embodiment, the workpiece may include a metal, such as a metal alloy. In one particular instance, the workpiece can consist essentially of a metal or metal alloy, such as stainless steel.

Item 1. A fixed abrasive article comprising:
a blend of abrasive particles comprising:
a first type of shaped abrasive particle comprising a first height (h1);
a second type of shaped abrasive particle comprising a second height (h2) less than the first height.

Item 2. The fixed abrasive article of item 1, further comprising a height ratio (h2/h1) of not greater than about 0.98, wherein the height ratio (h2/h1) is not greater than about 0.95 or not greater than about 0.93 or not greater than about 0.90 or not greater than about 0.88 or not greater than about 0.85 or not greater than about 0.83.

Item 3. The fixed abrasive article of item 2, wherein the height ratio (h2/h1) is at least about 0.05 or at least about 0.08 or at least about 0.1 or at least about 0.12 or at least about 0.15 or at least about 0.18 or at least about 0.2 or at least about 0.22 or at least about 0.25 or at least about 0.28 or at least about 0.3 or at least about 0.32 or at least about 0.35 or at least about 0.4 or at least about 0.45 or at least about 0.5 or at least about 0.55 or at least about 0.6 or at least about 0.65.

Item 4. The fixed abrasive article of item 1, further comprising a height difference (h1−h2) of at least about 1 micron.

Item 5. The fixed abrasive article of item 4, wherein the height difference (h1−h2) is at least about 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns.

Item 6. The fixed abrasive article of item 4, wherein the height difference (h1−h2) is not greater than about 2 mm or not greater than about 1 mm or not greater than about 800 microns or not greater than about 500 microns.

Item 7. The fixed abrasive article of item 1, wherein the first type of shaped abrasive particle comprises a first length (l1), and the second type of shaped abrasive particle comprises a second length (l2), and further comprising a length ratio (l1/l2) of at least about 0.05.

Item 8. The fixed abrasive article of item 7, wherein the length ratio (l1/l2) is at least about 0.08 or at least about 0.1 or at least about 0.12 or at least about 0.15 or at least about 0.18 or at least about 0.2 or at least about 0.22 or at least about 0.25 or at least about 0.28 or at least about 0.3 or at least about 0.32 or at least about 0.35 or at least about 0.4 or at least about 0.45 or at least about 0.5 or at least about 0.55 or at least about 0.6 or at least about 0.65 or at least about 0.7 or at least about 0.75 or at least about 0.8 or at least about 0.9 or at least about 0.95.

Item 9. The fixed abrasive article of item 7, wherein the length ratio (l1/l2) is not greater than about 10 or not greater than about 8 or not greater than about 6 or not greater than about 5 or not greater than about 4 or not greater than about 3 or not greater than about 2 or not greater than about 1.8 or not greater than about 1.5 or not greater than about 1.2.

Item 10. The fixed abrasive article of item 7, further comprising a length difference (L1−l2) of not greater than about 2 mm or not greater than about 1 mm or not greater than about 800 microns or not greater than about 500 microns or not greater than about 300 microns or not greater than about 100 microns or not greater than about 50 microns.

Item 11. The fixed abrasive article of item 10, wherein the length difference (L1−l2) can be at least about 1 micron or at least about 5 microns or at least about 10 microns.

Item 12. The fixed abrasive article of item 1, wherein the first type of shaped abrasive particle comprises a first width (w1), and the second type of shaped abrasive particle comprises a second width (w2), and further comprising a width ratio (w2/w1) of at least about 0.05.

Item 13. The fixed abrasive article of item 12, wherein the width ratio (w2/w1) is at least about 0.08 or at least about 0.1 or at least about 0.12 or at least about 0.15 or at least about 0.18 or at least about 0.2 or at least about 0.22 or at least about 0.25 or at least about 0.28 or at least about 0.3 or at least about 0.32 or at least about 0.35 or at least about 0.4 or at least about 0.45 or at least about 0.5 or at least about 0.55 or at least about 0.6 or at least about 0.65 or at least about 0.7 or at least about 0.75 or at least about 0.8 or at least about 0.9 or at least about 0.95.

Item 14. The fixed abrasive article of item 12, wherein the width ratio (w2/w1) is not greater than about 10 or not greater than about 8 or not greater than about 6 or not greater than about 5 or not greater than about 4 or not greater than about 3 or not greater than about 2 or not greater than about 1.8 or not greater than about 1.5 or not greater than about 1.2.

Item 15. The fixed abrasive article of item 12, further comprising a width difference (w1−w2) of not greater than about 2 mm or not greater than about 1 mm or not greater than about 800 microns or not greater than about 500 microns or not greater than about 300 microns or not greater than about 100 microns or not greater than about 50 microns.

Item 16. The fixed abrasive article of item 15, wherein the width difference (w1−w2) can be at least about 1 micron or at least about 5 microns or at least about 10 microns.

Item 17. The fixed abrasive article of item 1, wherein the first content is less than the second content.

Item 18. The fixed abrasive article of item 1, wherein the first content is not greater than about 90% of the total content of the blend or not greater than about 85% or not greater than about 80% or not greater than about 75% or not greater than about 70% or not greater than about 65% or not greater than about 60% or not greater than about 55% or not greater than about 50% or not greater than about 45% or not greater than about 40% or not greater than about 35% or not greater than about 30% or not greater than about 25% or not greater than about 20% or not greater than about 15% or not greater than about 10% or not greater than about 5%.

Item 19. The fixed abrasive article of item 1, wherein the first content is at least about 1% of the total content of the blend or at least about 5% or at least about 10% or at least about 15% or at least about 20% or at least about 25% or at least about 30% or at least about 35% or at least about 40% or at least about 45% or at least about 50% or at least about 55% or at least about 60% or at least about 65% or at least about 70% or at least about 75% or at least about 80% or at least about 85% or at least about 90% or at least about 95%.

Item 20. The fixed abrasive article of item 1, wherein the second content is not greater than about 98% of the total content of the blend or not greater than about 95% or not greater than about 90% or not greater than about 85% or not greater than about 80% or not greater than about 75% or not greater than about 70% or not greater than about 65% or not greater than about 60% or not greater than about 55% or not greater than about 50% or not greater than about 45% or not greater than about 40% or not greater than about 35% or not greater than about 30% or not greater than about 25% or not greater than about 20% or not greater than about 15% or not greater than about 10% or not greater than about 5%.

Item 21. The fixed abrasive article of item 1, wherein the second content is at least about 1% of the total content of the blend or at least about 5% or at least about 10% or at least about 15% or at least about 20% or at least about 25% or at least about 30% or at least about 35% or at least about 40% or at least about 45% or at least about 50% or at least about 55% or at least about 60% or at least about 65% or at least about 70% or at least about 75% or at least about 80% or at least about 85% or at least about 90% or at least about 95%.

Item 22. The fixed abrasive article of item 1, wherein the blend of abrasive particles comprises a first content (C1) of the first type of shaped abrasive particle, and a second content (C2) of the second type of shaped abrasive particle, and further comprising a blend ratio (C1/C2) of not greater than about 10.

Item 23. The fixed abrasive article of item 22, wherein the blend ratio (C1/C2) is not greater than about 8 or not greater than about 6 or not greater than about 5 or not greater than about 4 or not greater than about 3 or not greater than about 2 or not greater than about 1.8 or not greater than about 1.5 or not greater than about 1.2 or not greater than about 1 or not greater than about 0.9 or not greater than about 0.8 or not greater than about 0.7 or not greater than about 0.6 or not greater than about 0.5 or not greater than about 0.4 or not greater than about 0.3 or not greater than about 0.2.

Item 24. The fixed abrasive article of item 22, wherein the blend ratio (C1/C2) is at least about 0.1 or at least about 0.15 or at least about 0.2 or at least about 0.22 or at least about 0.25 or at least about 0.28 or at least about 0.3 or at least about 0.32 or at least about 0.35 or at least about 0.4 or at least about 0.45 or at least about 0.5 or at least about 0.55 or at least about 0.6 or at least about 0.65 or at least about 0.7 or at least about 0.75 or at least about 0.8 or at least about 0.9 or at least about 0.95 or at least about 1 or at least about 1.5 or at least about 2 or at least about 3 or at least about 4 or at least about 5.

Item 25. The fixed abrasive article of item 1, wherein the blend of abrasive particles includes a majority content of shaped abrasive particles.

Item 26. The fixed abrasive article of item 1, wherein the blend of abrasive particles consists essentially of the first type of shaped abrasive particle and the second type of shaped abrasive particle.

Item 27. The fixed abrasive article of item 1, wherein the blend further comprises a third type of abrasive particle, wherein the third type of abrasive particle comprises a shaped abrasive particle, wherein the third type of abrasive particle comprises a diluent type of abrasive particle, wherein the diluent type of abrasive particle comprises an irregular shape.

Item 28. The fixed abrasive article of item 1, wherein the fixed abrasive article is selected from the group consisting of a bonded abrasive article, a coated abrasive article, and a combination thereof.

Item 29. The fixed abrasive article of item 1, wherein the fixed abrasive article comprises a substrate, wherein the substrate comprises a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea-formaldehyde resin, polyester, polyurethane, polypropylene, polyimides, and a combination thereof.

Item 30. The fixed abrasive article of item 29, wherein the backing comprises an additive selected from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 31. The fixed abrasive article of item 29, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 32. The fixed abrasive article of item 31, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 33. The fixed abrasive article of item 1, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

Item 34. The fixed abrasive article of item 33, wherein the plurality of shaped abrasive particles includes at least a portion of the first type of shaped abrasive particles, wherein the plurality of shaped abrasive particles includes all of the first type of shaped abrasive particles.

Item 35. The fixed abrasive article of item 33, wherein the plurality of shaped abrasive particles includes at least a portion of the second type of shaped abrasive particles, wherein the plurality of shaped abrasive particles includes all of the second type of shaped abrasive particles.

Item 36. The fixed abrasive article of item 33, wherein a majority of the first type of abrasive particles are coupled to the backing in a side orientation, wherein at least about 55% of the shaped abrasive particles of the plurality of shaped abrasive particles are coupled to the backing in a side orientation or at least about 60% or at least about 65% or at least about 70% or at least about 75% or at least about 77% or at least about 80%, and not greater than about 99% or not greater than about 95% or not greater than about 90% or not greater than about 85%.

Item 37. The fixed abrasive article of item 33, wherein a majority of the second type of abrasive particles are coupled to the backing in a side orientation, wherein at least about 55% of the shaped abrasive particles of the plurality of shaped abrasive particles are coupled to the backing in a side orientation or at least about 60% or at least about 65% or at least about 70% or at least about 75% or at least about 77% or at least about 80%, and not greater than about 99% or not greater than about 95% or not greater than about 90% or not greater than about 85%.

Item 38. The fixed abrasive article of item 1, wherein the fixed abrasive article comprises a coated abrasive article having an open coat of the blend of shaped abrasive particles on a backing, wherein the open coat comprises a coating density of not greater than about 70 particles/cm² or not greater than about 65 particles/cm² or not greater than about 60 particles/cm² or not greater than about 55 particles/cm² or not greater than about 50 particles/cm², at least about 5 particles/cm² or at least about 10 particles/cm².

Item 39. The fixed abrasive article of item 1, wherein the fixed abrasive article comprises a coated abrasive article having a closed coat of the blend of shaped abrasive particles on a backing, wherein the closed coat comprises a coating density of at least about 75 particles/cm² or at least about 80 particles/cm² or at least about 85 particles/cm² or at least about 90 particles/cm² or at least about 100 particles/cm².

Item 40. The fixed abrasive article of item 1, wherein the first type of shaped abrasive particle comprises a body having a length (l), a width (w), and a height (hi), wherein the width≥length, the length≥height, and the width≥height.

Item 41. The fixed abrasive article of item 40, wherein the height (h) is at least about 20% of the width (w) or at least about 25% or at least about 30% or at least about 33%, and not greater than about 80% or not greater than about 76% or not greater than about 73% or not greater than about 70% or not greater than about 68% of the width or not greater than about 56% of the width or not greater than about 48% of the width or not greater than about 40% of the width.

Item 42. The fixed abrasive article of item 40, wherein the height (h) is at least about 400 microns or at least about 450 microns or at least about 475 microns or at least about 500 microns, and not greater than about 3 mm or not greater than about 2 mm or not greater than about 1.5 mm or not greater than about 1 mm or not greater than about 800 microns.

Item 43. The fixed abrasive article of item 40, wherein the width is at least about 600 microns or at least about 700 microns or at least about 800 microns or at least about 900 microns, and not greater than about 4 mm or not greater than about 3 mm or not greater than about 2.5 mm or not greater than about 2 mm.

Item 44. The fixed abrasive article of item 40, wherein the body comprises a percent flashing of at least about 1%, such as at least about 2% or at least about 3% or at least about 5% or at least about 8% or at least about 10% or at least about 12% or at least about 15% or at least about 18% or at least about 20%, and not greater than about 40% or not greater than about 35% or not greater than about 30% or not greater than about 25% or not greater than about 20% or not greater than about 18% or not greater than about 15% or not greater than about 12% or not greater than about 10% or not greater than about 8% or not greater than about 6% or not greater than about 4%.

Item 45. The fixed abrasive article of item 40, wherein the body comprises a dishing value (d) of not greater than about 2 or not greater than about 1.9 or not greater than about 1.8 or not greater than about 1.7 or not greater than about 1.6 or not greater than about 1.5 or not greater than about 1.2, and at least about 0.9 or at least about 1.0.

Item 46. The fixed abrasive article of item 40, wherein the body comprises a primary aspect ratio of width:length of at least about 1:1 and not greater than about 10:1.

Item 47. The fixed abrasive article of item 40, wherein the body comprises a secondary aspect ratio defined by a ratio of width:height within a range between about 5:1 and about 1:1.

Item 48. The fixed abrasive article of item 40, wherein the body comprises a tertiary aspect ratio defined by a ratio of length:height within a range between about 6:1 and about 1:1.

Item 49. The fixed abrasive article of item 40, wherein the body comprises a two-dimensional polygonal shape as viewed in a plane defined by a length and width, wherein the body comprises a shape selected from the group consisting of triangular, quadrilateral, rectangular, trapezoidal, pentagonal, hexagonal, heptagonal, octagonal, and a combination thereof, wherein the body comprises a two-dimensional shape as viewed in a plane defined by a length and a width of the body selected from the group consisting of ellipsoids, Greek alphabet characters, Latin alphabet characters, Russian alphabet characters, complex polygonal shapes, irregular shapes, and a combination thereof.

Item 50. The fixed abrasive article of item 40, wherein the body comprises a two-dimensional triangular shape as viewed in a plane defined by a length and width.

Item 51. The fixed abrasive article of item 40, wherein the body is essentially free of a binder, wherein the body is essentially free of an organic material.

Item 52. The fixed abrasive article of item 40, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 53. The fixed abrasive article of item 40, wherein the body consists essentially of alumina.

Item 54. The fixed abrasive article of item 40, wherein the body is formed from a seeded sol gel.

Item 55. The fixed abrasive article of item 40, wherein the body comprises a polycrystalline material having an average grain size not greater than about 1 micron.

Item 56. The fixed abrasive article of item 40, wherein the body is a composite comprising at least about two different types of grains.

Item 57. The fixed abrasive article of item 40, wherein the body comprises an additive, wherein the additive comprises an oxide, wherein the additive comprises a metal element, wherein the additive comprises a rare-earth element.

Item 58. The fixed abrasive article of item 57, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 59. The fixed abrasive article of item 1, wherein the first type of shaped abrasive particle comprises a body having a first major surface, a second major surface, and at least one side surface extending between the first major surface and the second major surface.

Item 60. The fixed abrasive article of item 59, wherein the first major surface defines an area different than the second major surface, wherein the first major surface defines an area greater than an area defined by the second major surface, wherein the first major surface defines an area less than an area defined by the second major surface.

Item 61. The fixed abrasive article of item 1, wherein the first type of shaped abrasive particle comprises a first abrasive characteristic selected from the group consisting of two-dimensional shape, average particle size, particle color, hardness, friability, toughness, density, specific surface area, and a combination thereof.

Item 62. The fixed abrasive article of item 61, wherein the second type of shaped abrasive particle comprises a second abrasive characteristic selected from the group consisting of two-dimensional shape, average particle size, particle color, hardness, friability, toughness, density, specific surface area, and a combination thereof.

Item 63. The fixed abrasive article of item 62, wherein at least one first abrasive characteristic and second abrasive characteristic are essentially the same compared to each other, wherein at least two first abrasive characteristics and two second abrasive characteristics are essentially the same compared to each other.

Item 64. The fixed abrasive article of item 62, wherein at least one first abrasive characteristic and one second abrasive characteristic are different compared to each other, wherein at least two first abrasive characteristics and two second abrasive characteristics are different compared to each other.

Item 65. The fixed abrasive article of item 1, wherein the second type of shaped abrasive particle comprises a body having a length (l), a width (w), and a height (hi), wherein the width>length, the length>height, and the width>height.

Item 66. The fixed abrasive article of item 65, wherein the height (h) is at least about 20% of the width (w) or at least about 25% or at least about 30% or at least about 33%, and not greater than about 80% or not greater than about 76% or not greater than about 73% or not greater than about 70% or not greater than about 68% of the width or not greater than about 56% of the width or not greater than about 48% of the width or not greater than about 40% of the width.

Item 67. The fixed abrasive article of item 65, wherein the height (h) is at least about 400 microns or at least about 450 microns or at least about 475 microns or at least about 500 microns, and not greater than about 3 mm or not greater than about 2 mm or not greater than about 1.5 mm or not greater than about 1 mm or not greater than about 800 microns.

Item 68. The fixed abrasive article of item 65, wherein the width is at least about 600 microns or at least about 700 microns or at least about 800 microns or at least about 900 microns, and not greater than about 4 mm or not greater than about 3 mm or not greater than about 2.5 mm or not greater than about 2 mm.

Item 69. The fixed abrasive article of item 65, wherein the body comprises a percent flashing of at least about 1%, such as at least about 2% or at least about 3% or at least about 5% or at least about 8% or at least about 10% or at least about 12% or at least about 15% or at least about 18% or at least about 20%, and not greater than about 40% or not greater than about 35% or not greater than about 30% or not greater than about 25% or not greater than about 20% or not greater than about 18% or not greater than about 15% or not greater than about 12% or not greater than about 10% or not greater than about 8% or not greater than about 6% or not greater than about 4%.

Item 70. The fixed abrasive article of item 65, wherein the body comprises a dishing value (d) of not greater than about 2 or not greater than about 1.9 or not greater than about 1.8 or not greater than about 1.7 or not greater than about 1.6 or not greater than about 1.5 or not greater than about 1.2, and at least about 0.9 or at least about 1.0.

Item 71. The fixed abrasive article of item 65, wherein the body comprises a primary aspect ratio of width:length of at least about 1:1 and not greater than about 10:1.

Item 72. The fixed abrasive article of item 65, wherein the body comprises a secondary aspect ratio defined by a ratio of width:height within a range between about 5:1 and about 1:1.

Item 73. The fixed abrasive article of item 65, wherein the body comprises a tertiary aspect ratio defined by a ratio of length:height within a range between about 6:1 and about 1:1.

Item 74. The fixed abrasive article of item 65, wherein the body comprises a two-dimensional polygonal shape as viewed in a plane defined by a length and width, wherein the body comprises a shape selected from the group consisting of triangular, quadrilateral, rectangular, trapezoidal, pentagonal, hexagonal, heptagonal, octagonal, and a combination thereof, wherein the body comprises a two-dimensional shape as viewed in a plane defined by a length and a width of the body selected from the group consisting of ellipsoids, Greek alphabet characters, Latin alphabet characters, Russian alphabet characters, complex polygonal shapes, irregular shapes, and a combination thereof.

Item 75. The fixed abrasive article of item 65, wherein the body comprises a two-dimensional triangular shape as viewed in a plane defined by a length and width.

Item 76. The fixed abrasive article of item 65, wherein the body is essentially free of a binder, wherein the body is essentially free of an organic material.

Item 77. The fixed abrasive article of item 65, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 78. The fixed abrasive article of item 65, wherein the body consists essentially of alumina.

Item 79. The fixed abrasive article of item 65, wherein the body is formed from a seeded sol gel.

Item 80. The fixed abrasive article of item 65, wherein the body comprises a polycrystalline material having an average grain size not greater than about 1 micron.

Item 81. The fixed abrasive article of item 65, wherein the body is a composite comprising at least about two different types of grains.

Item 82. The fixed abrasive article of item 65, wherein the body comprises an additive, wherein the additive comprises an oxide, wherein the additive comprises a metal element, wherein the additive comprises a rare-earth element.

Item 83. The fixed abrasive article of item 82, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 84. The fixed abrasive article of item 1, wherein the second type of shaped abrasive particle comprises a body having a first major surface, a second major surface, and at least one side surface extending between the first major surface and the second major surface.

Item 85. The fixed abrasive article of item 84, wherein the first major surface defines an area different than the second major surface, wherein the first major surface defines an area greater than an area defined by the second major surface, wherein the first major surface defines an area less than an area defined by the second major surface.

Item 86. A fixed abrasive article comprising:
a blend of abrasive particles comprising:
a first type of shaped abrasive particle comprising a first height (h1);
a second type of shaped abrasive particle comprising a second height (h2) less than the first height; and
wherein the fixed abrasive article comprises a stainless steel lifespan of at least about 11 in$^3$.

Item 87. The fixed abrasive article of item 86, wherein the fixed abrasive article comprises a stainless steel lifespan of at least about 11.5 in$^3$ or at least about 12 in$^3$, and wherein the fixed abrasive article comprises a stainless steel lifespan of not greater than about 25 in$^3$.

Item 88. The fixed abrasive article of item 86, further comprising a height ratio (h2/h1) of not greater than about 0.98.

Item 89. The fixed abrasive article of item 88, wherein the height ratio (h2/h1) is at least about 0.05.

Item 90. The fixed abrasive article of item 86, further comprising a height difference (h1−h2) of at least about 1 micron.

Item 91. The fixed abrasive article of item 90, wherein the height difference (h1−h2) is not greater than about 2 mm.

Item 92. The fixed abrasive article of item 86, wherein the first type of shaped abrasive particle comprises a first length (l1), and the second type of shaped abrasive particle comprises a second length (l2), and further comprising a length ratio (l1/l2) of at least about 0.05.

Item 93. The fixed abrasive article of item 92, further comprising a length difference (L1−l2) of not greater than about 2 mm.

Item 94. The fixed abrasive article of item 86, wherein the first type of shaped abrasive particle comprises a first width (w1), and the second type of shaped abrasive particle comprises a second width (w2), and further comprising a width ratio (w2/w1) of at least about 0.05.

Item 95. The fixed abrasive article of item 94, further comprising a width difference (w1−w2) of not greater than about 2 mm.

Item 96. The fixed abrasive article of item 86, wherein the first content is less than the second content.

Item 97. The fixed abrasive article of item 86, wherein the first content is not greater than about 90% of a total content of the blend.

Item 98. The fixed abrasive article of item 86, wherein the first content is at least about 1% of a total content of the blend.

Item 99. The fixed abrasive article of item 86, wherein the second content is not greater than about 98% of a total content of the blend.

Item 100. The fixed abrasive article of item 86, wherein the second content is at least about 1% of a total content of the blend.

Item 101. The fixed abrasive article of item 86, wherein the blend of abrasive particles comprises a first content (C1) of the first type of shaped abrasive particle, and a second content (C2) of the second type of shaped abrasive particle, and further comprising a blend ratio (C1/C2) of not greater than about 10.

Item 102. The fixed abrasive article of item 86, wherein the blend of abrasive particles includes a majority content of shaped abrasive particles, wherein the blend of abrasive particles consists essentially of the first type of shaped abrasive particle and the second type of shaped abrasive particle.

Item 103. The fixed abrasive article of item 86, wherein the blend further comprises a third type of abrasive particle, wherein the third type of abrasive particle comprises a shaped abrasive particle, wherein the third type of abrasive particle comprises a diluent type of abrasive particle, wherein the diluent type of abrasive particle comprises an irregular shape.

Item 104. The fixed abrasive article of item 86, wherein the fixed abrasive article is selected from the group consisting of a bonded abrasive article, a coated abrasive article, and a combination thereof.

Item 105. The fixed abrasive article of item 86, wherein the fixed abrasive article comprises a substrate, wherein the substrate comprises a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea-formaldehyde resin, polyester, polyurethane, polypropylene, polyimides, and a combination thereof.

Item 106. The fixed abrasive article of item 105, wherein the backing comprises an additive selected from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 107. The fixed abrasive article of item 105, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 108. The fixed abrasive article of item 107, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 109. The fixed abrasive article of item 86, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

Item 110. The fixed abrasive article of item 86, wherein the first type of shaped abrasive particle comprises a body having a length (l), a width (w), and a height (hi), wherein the width>length, the length>height, and the width>height.

Item 111. The fixed abrasive article of item 110, wherein the height (h) is at least about 20% of the width (w), and not greater than about 80% of the width.

Item 112. The fixed abrasive article of item 110, wherein the body comprises a percent flashing of at least about 1%.

Item 113. The fixed abrasive article of item 110, wherein the body comprises a dishing value (d) of not greater than about 2.

Item 114. The fixed abrasive article of item 110, wherein the body comprises a primary aspect ratio of width:length of at least about 1:1 and not greater than about 10:1.

Item 115. The fixed abrasive article of item 110, wherein the body comprises a secondary aspect ratio defined by a ratio of width:height within a range between about 5:1 and about 1:1.

Item 116. The fixed abrasive article of item 110, wherein the body comprises a tertiary aspect ratio defined by a ratio of length:height within a range between about 6:1 and about 1:1.

Item 117. The fixed abrasive article of item 110, wherein the body comprises a two-dimensional polygonal shape as viewed in a plane defined by a length and width, wherein the body comprises a shape selected from the group consisting of triangular, quadrilateral, rectangular, trapezoidal, pentagonal, hexagonal, heptagonal, octagonal, and a combination thereof, wherein the body comprises a two-dimensional shape as viewed in a plane defined by a length and a width of the body selected from the group consisting of ellipsoids, Greek alphabet characters, Latin alphabet characters, Russian alphabet characters, complex polygonal shapes, irregular shapes, and a combination thereof.

Item 118. The fixed abrasive article of item 110, wherein the body is essentially free of a binder, wherein the body is essentially free of an organic material.

Item 119. The fixed abrasive article of item 110, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 120. The fixed abrasive article of item 110, wherein the body comprises an additive, wherein the additive comprises an oxide, wherein the additive comprises a metal element, wherein the additive comprises a rare-earth element.

Item 121. The fixed abrasive article of item 86, wherein the first type of shaped abrasive particle comprises a first abrasive characteristic selected from the group consisting of two-dimensional shape, average particle size, particle color, hardness, friability, toughness, density, specific surface area, and a combination thereof.

Item 122. The fixed abrasive article of item 121, wherein the second type of shaped abrasive particle comprises a second abrasive characteristic selected from the group consisting of two-dimensional shape, average particle size, particle color, hardness, friability, toughness, density, specific surface area, and a combination thereof.

Item 123. The fixed abrasive article of item 122, wherein at least one first abrasive characteristic and second abrasive characteristic are essentially the same compared to each other, wherein at least two first abrasive characteristics and two second abrasive characteristics are essentially the same compared to each other.

Item 124. The fixed abrasive article of item 122, wherein at least one first abrasive characteristic and one second abrasive characteristic are different compared to each other, wherein at least two first abrasive characteristics and two second abrasive characteristics are different compared to each other.

Item 125. The fixed abrasive article of item 110, wherein the second type of shaped abrasive particle comprises a body having a length (l), a width (w), and a height (hi), wherein the width>length, the length>height, and the width>height.

Item 126. The fixed abrasive article of item 125, wherein the height (h) is at least about 20% of the width (w), and not greater than about 80% of the width.

Item 127. The fixed abrasive article of item 125, wherein the height (h) is at least about 400 microns.

Item 128. The fixed abrasive article of item 125, wherein the width is at least about 600 microns.

Item 129. The fixed abrasive article of item 125, wherein the body comprises a percent flashing of at least about 1%.

Item 130. The fixed abrasive article of item 125, wherein the body comprises a dishing value (d) of not greater than about 2.

Item 131. The fixed abrasive article of item 125, wherein the body comprises a primary aspect ratio of width:length of at least about 1:1 and not greater than about 10:1.

Item 132. The fixed abrasive article of item 125, wherein the body comprises a secondary aspect ratio defined by a ratio of width:height within a range between about 5:1 and about 1:1.

Item 133. The fixed abrasive article of item 125, wherein the body comprises a tertiary aspect ratio defined by a ratio of length:height within a range between about 6:1 and about 1:1.

Item 134. The fixed abrasive article of item 125, wherein the body comprises a two-dimensional polygonal shape as viewed in a plane defined by a length and width, wherein the body comprises a shape selected from the group consisting of triangular, quadrilateral, rectangular, trapezoidal, pentagonal, hexagonal, heptagonal, octagonal, and a combination thereof, wherein the body comprises a two-dimensional shape as viewed in a plane defined by a length and a width of the body selected from the group consisting of ellipsoids, Greek alphabet characters, Latin alphabet characters, Russian alphabet characters, complex polygonal shapes, irregular shapes, and a combination thereof.

Item 135. The fixed abrasive article of item 125, wherein the body comprises a two-dimensional triangular shape as viewed in a plane defined by a length and width.

Item 136. The fixed abrasive article of item 125, wherein the body is essentially free of a binder, wherein the body is essentially free of an organic material.

Item 137. The fixed abrasive article of item 125, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 138. The fixed abrasive article of item 125, wherein the body is a composite comprising at least about 2 different types of abrasive grains.

Item 139. The fixed abrasive article of item 125, wherein the body comprises an additive, wherein the additive comprises an oxide, wherein the additive comprises a metal element, wherein the additive comprises a rare-earth element.

Item 140. The fixed abrasive article of item 125, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 141. A method of removing material from a workpiece using an abrasive article including a blend of abrasive particles comprising:
a first type of shaped abrasive particle comprising a first height (h1);
a second type of shaped abrasive particle comprising a second height (h2) less than the first height.

Item 142. The method of item 141, wherein the workpiece comprises a material selected from the group consisting of an organic material, an inorganic material, and a combination thereof, wherein the workpiece comprises a metal, wherein the workpiece comprises a metal alloy.

Item 143. The method of item 141, wherein the fixed abrasive article comprises a stainless steel lifespan of at least about 11 in$^3$.

Item 144. The method of item 141, further comprising a height ratio (h2/h1) of not greater than about 0.98.

Item 145. The method of item 144, wherein the height ratio (h2/h1) is at least about 0.05.

Item 146. The method of item 141, further comprising a height difference (h1−h2) of at least about 1 micron.

Item 147. The method of item 146, wherein the height difference (h1−h2) is not greater than about 2 mm.

Item 148. The method of item 141, wherein the first type of shaped abrasive particle comprises a first length (l1), and the second type of shaped abrasive particle comprises a second length (l2), and further comprising a length ratio (l1/l2) of at least about 0.05.

Item 149. The method of item 148, further comprising a length difference (L1−l2) of not greater than about 2 mm.

Item 150. The method of item 141, wherein the first type of shaped abrasive particle comprises a first width (w1), and the second type of shaped abrasive particle comprises a second width (w2), and further comprising a width ratio (w2/w1) of at least about 0.05.

Item 151. The method of item 150, further comprising a width difference (w1−w2) of not greater than about 2 mm.

Item 152. The method of item 141, wherein the blend of abrasive particles comprises a first content (C1) of the first type of shaped abrasive particle, and a second content (C2) of the second type of shaped abrasive particle, and further comprising a blend ratio (C1/C2) of not greater than about 10.

Item 153. The method of item 141, wherein the blend of abrasive particles includes a majority content of shaped abrasive particles, wherein the blend of abrasive particles consists essentially of the first type of shaped abrasive particle and the second type of shaped abrasive particle.

Item 154. The method of item 141, wherein the blend further comprises a third type of abrasive particle, wherein the third type of abrasive particle comprises a shaped abrasive particle, wherein the third type of abrasive particle comprises a diluent type of abrasive particle, wherein the diluent type of abrasive particle comprises an irregular shape.

Item 155. The method of item 141, wherein the fixed abrasive article is selected from the group consisting of a bonded abrasive article, a coated abrasive article, and a combination thereof.

Item 156. The method of item 141, wherein the fixed abrasive article comprises a substrate, wherein the substrate comprises a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea-formaldehyde resin, polyester, polyurethane, polypropylene, polyimides, and a combination thereof.

Item 157. The method of item 156, wherein the backing comprises an additive selected from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 158. The method of item 157, wherein further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 159. The method of item 158, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 160. The method of item 141, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

EXAMPLES

Example 1

Five samples were used to conduct a comparative grinding operation. Each of the five samples used essentially the same structure, including backing and adhesive layers; however, the samples differed in the type of abrasive particles. A first sample, Sample S1, represents a coated abrasive, including a blend of shaped abrasive particles according to embodiments described herein. Sample S1 includes a plurality of a first type of shaped abrasive particles having a median internal height of approximately 500 microns. The blend further includes a plurality of a second type of shaped abrasive particles having a median internal height of approximately 400 microns. The blend has a ratio (C1/C2) of approximately 2.3. Approximately 80% of the shaped abrasive particles of the blend are positioned in a predetermined side orientation on the backing and have a normalized weight of shaped abrasive particles of 40 lbs./ream.

A second sample, Sample S2, represents a coated abrasive, including a blend of shaped abrasive particles according to embodiments described herein. Sample S1 includes a plurality of a first type of shaped abrasive particles having a median internal height of approximately 500 microns. The blend further includes a plurality of a second type of shaped abrasive particles having a median internal height of approximately 400 microns. The blend has a ratio (C1/C2) of approximately 1. Approximately 80% of the shaped abrasive particles of the blend are positioned in a predetermined side orientation on the backing and have a normalized weight of shaped abrasive particles of 40 lbs./ream.

A third sample, Sample S3, represents a coated abrasive, including a blend of shaped abrasive particles according to embodiments described herein. Sample S1 includes a plurality of a first type of shaped abrasive particles having a median internal height of approximately 500 microns. The blend further includes a plurality of a second type of shaped abrasive particles having a median internal height of approximately 400 microns. The blend has a ratio (C1/C2) of approximately 0.43. Approximately 80% of the shaped abrasive particles of the blend are positioned in a predetermined side orientation on the backing and have a normalized weight of shaped abrasive particles of 40 lbs./ream.

A fourth sample, Sample CS4 represents a conventional coated abrasive article including a single type of shaped abrasive particle having a median internal height of approximately 400 microns. Approximately 80% of these shaped abrasive particles are positioned in a predetermined side orientation on the backing and have a normalized weight of shaped abrasive particles of 40 lbs./ream.

A fifth sample, Sample CS5, represents a conventional coated abrasive article, including a single type of shaped abrasive particle having a median internal height of approximately 500 microns. Approximately 80% of these shaped abrasive particles are positioned in a predetermined side orientation on the backing and have a normalized weight of shaped abrasive particles of 40 lbs./ream.

The samples were tested in an automated grinding system according to the conditions provided in Table 1 below.

TABLE 1

| Test platform: | Okuma Screening Test |
|---|---|
| Test conditions: | Dry, Straight Plunge |
| | Constant MRR' = 4 inch$^3$/min/inch |
| | Belt speed = Vs = 7500 sfpm (38 m/s) |
| | Work material: 304L ss |
| | Hardness: 104 HRB |
| | Size: 0.5" × 0.5" × 6 inches |
| | Contact width = 0.5" inch |
| Measurements: | Power, Grinding Forces, MRR' and SGE |

Figure 11:
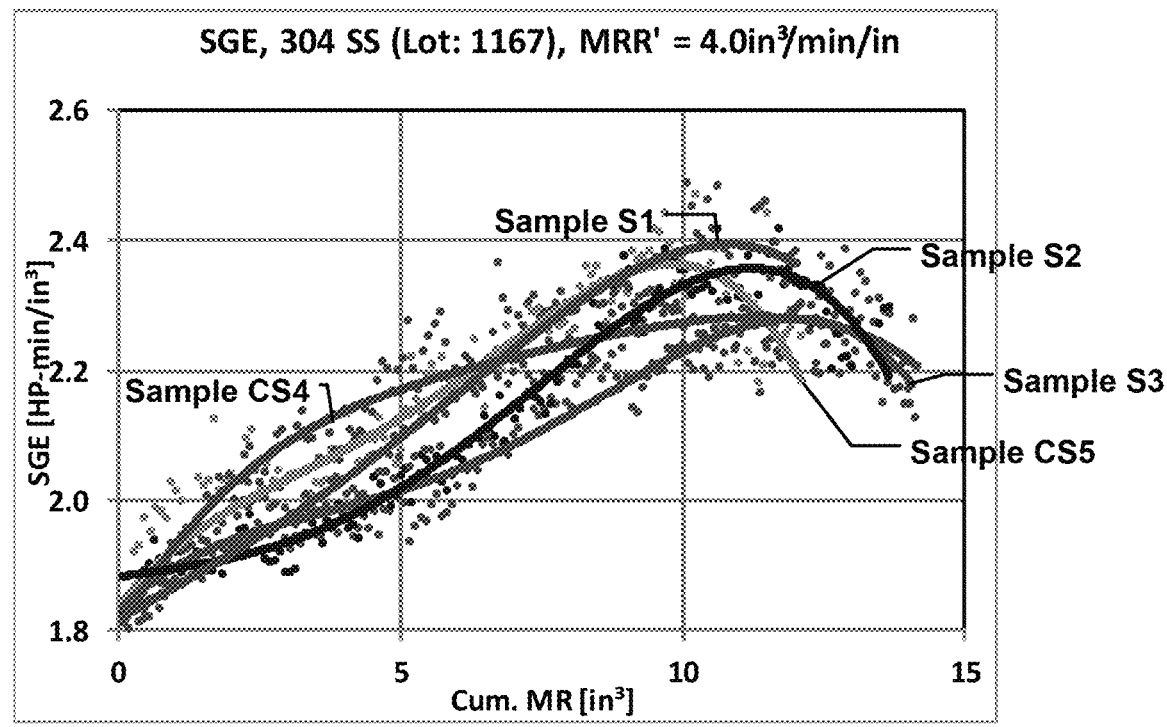
FIG. 11 includes a plot of specific grinding energy versus cumulative material removed for a sample corresponding to an embodiment herein and two conventional samples.
Figure 12:
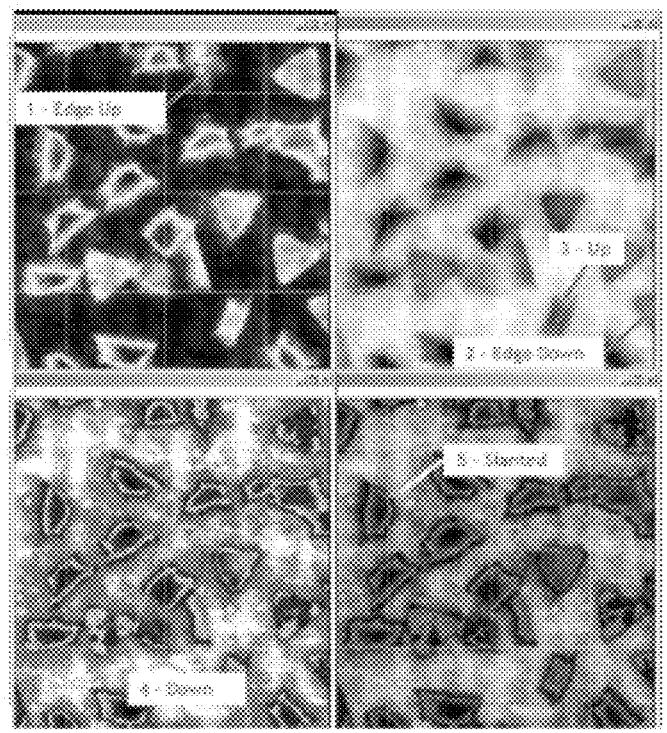
FIG. 12 includes images representative of portions of a coated abrasive according to an embodiment and used to analyze the orientation of shaped abrasive particles on the backing.

FIG. 11 includes a plot of specific grinding energy versus cumulative material removed for each of the samples. As clearly illustrated, the life of Sample CS5 was significantly less than Samples S2 and S3. Quite remarkably, and unexpectedly, and despite Samples S2-S3 having a blend of a first type of shaped abrasive particle and a second type of shaped abrasive particle, which may be expected to have a cumulative material removal rate that is between Samples CS4 and CS5, Samples S2 and S3 had a life that was equivalent to CS4 and greater than CS5. Moreover, each of the Samples S1-S3 had an initial specific grinding energy between 0 to 5 cubic inches of material removed that was lower than the comparative samples CS4 and CS5 in the same initial stages. Moreover, and equally unexpected, Sample S3 has a lower specific grinding energy for the majority of the test as compared to either Sample CS1 or Sample CS2.

The present application represents a departure from the state of the art. The coated abrasive articles of the embodiments herein include a particular combination of features distinct from other conventionally available abrasive articles, including, but not limited to, incorporation of a blend including a first type of shaped abrasive particle and a second type of shaped abrasive particle. Notably, the first type and second type of shaped abrasive particles can have a particular combination of features, including, but not limited to, a difference in height with respect to each other. Moreover, each of the shaped abrasive particles can have particular features, such as aspect ratio, composition, additives, two-dimensional shape, three-dimensional shape, intern height, difference in height profile, flashing percentage, dishing, and the like. Moreover, the blend may utilize a combination of certain features including, but not limited to, height ratio, height difference, length ratio, length difference, width ratio, width difference, relative contents of the first and second types of shaped abrasive particles, and the like. Moreover, while not completely understood and without wishing to be tied to a particular theory, it is thought that one or a combination of these features of the embodiments described herein facilitate the remarkable and unexpected performance of these coated abrasive articles.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A coated abrasive article comprising:
a blend of abrasive particles comprising:
a first content (C1) of a first type of shaped abrasive particle comprising a first height (h1);
a second content (C2) of a second type of shaped abrasive particle comprising a second height (h2) less than the first height, and
wherein the first content is at least about 1% and not greater than about 70% of the total content of the blend, and
wherein the second content at least about 1% and not greater than about 98% of the total content of the blend, and
wherein at least a portion of the abrasive particles are in an open coat configuration, and
wherein the coated abrasive article has an open-coat coating density of shaped abrasive particles of not greater than about 70 particles/cm$^2$.

2. The coated abrasive article of claim 1, wherein the coated abrasive article has an open-coat coating density of shaped abrasive particles of at least 5 particles/cm$^2$.

3. The coated abrasive article of claim 1, further comprising an additive.

4. The coated abrasive article of claim 3, wherein the additive is a grinding agent.

5. The coated abrasive article of claim 1, wherein the coated abrasive article has an open-coat coating density of the first type of shaped abrasive particles of at least 5 particles/cm$^2$.

6. The coated abrasive article of claim 1, wherein the coated abrasive article has an open-coat coating density of a first type of shaped abrasive particles of not greater than 70particles/cm$^2$.

7. The coated abrasive article of claim 1, wherein the coated abrasive article has an open-coat coating density of the second type of shaped abrasive particles of at least 5particles/cm$^2$.

8. The coated abrasive article of claim 1, wherein the coated abrasive article has an open-coat coating density of a second type of shaped abrasive particles of not greater than 70particles/cm².

9. The coated abrasive article of claim 1, wherein the percentage coating of the abrasive particles relative to the total area of the abrasive surface can be not greater than 50%.

10. The coated abrasive article of claim 1, wherein the blend of abrasive particles has a blend ratio (C1/C2) of at least about 0.1 and not greater than about 1.0.

11. The coated abrasive article of claim 1, wherein the abrasive particles have a height ratio (h2/h1) of at least about 0.05 and not greater than about 0.98.

12. The coated abrasive article of claim 1, wherein the abrasive particles have a height difference (h1-h2) of at least about 1 micron and not greater than about 2 mm.

13. The coated abrasive article of claim 1, wherein a majority of the first type of abrasive particles are coupled to the backing in a side orientation.

14. The coated abrasive article of claim 1, wherein a majority of the second type of abrasive particles are coupled to the backing in a side orientation.

15. The coated abrasive article of claim 1, wherein each shaped abrasive particle of the first type of shaped abrasive particles comprises a body having a height and a width, and wherein the body comprises a two-dimensional shape in the plane of a length and the width selected from the group consisting of triangular, quadrilateral, rectangular, trapezoidal, pentagonal, hexagonal, heptagonal, octagonal, and a combination thereof.

16. The coated abrasive article of claim 15, wherein the body comprises a two-dimensional triangular shape as viewed in a plane defined by a length and width.

17. The coated abrasive article of claim 15, wherein the body is essentially free of a binder.

18. The coated abrasive article of claim 15, wherein the body has an upper surface with an upper surface area, and a lower surface with a lower surface area, wherein the upper surface area is different than the lower surface area.

19. The coated abrasive article of claim 15, wherein the body comprises alumina.

20. The coated abrasive article of claim 1, wherein the first type of shaped abrasive particle comprises a body having a primary aspect ratio, width: length, of at least 1:1 and the first heigh (h1) is measured in a direction perpendicular to the length and width of the body.

* * * * *